United States Patent
Kumar et al.

(10) Patent No.: US 12,361,077 B2
(45) Date of Patent: Jul. 15, 2025

(54) SHARABLE PRIVACY-ORIENTED PERSONALIZATION MODEL

(71) Applicant: Microsoft Technology Licensing, LLC, Redmond, WA (US)

(72) Inventors: Divya Kumar, Sammamish, WA (US); Jennifer L. Myers, Edmonds, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 17/845,678

(22) Filed: Jun. 21, 2022

(65) Prior Publication Data

US 2023/0409650 A1  Dec. 21, 2023

(51) Int. Cl.
G06F 16/00 (2019.01)
G06F 16/9535 (2019.01)
H04L 67/306 (2022.01)
H04L 67/52 (2022.01)

(52) U.S. Cl.
CPC ........ G06F 16/9535 (2019.01); H04L 67/306 (2013.01); H04L 67/52 (2022.05)

(58) Field of Classification Search
CPC .................................................. G06F 16/9535
See application file for complete search history.

(56) References Cited

U.S. PATENT DOCUMENTS

| | | | |
|---|---|---|---|
| 7,613,692 B2 * | 11/2009 | Hamilton | G06F 16/9535 |
| 7,685,237 B1 * | 3/2010 | Weaver | G06Q 10/10 |
| | | | 709/205 |
| 9,600,297 B1 * | 3/2017 | Buyukkokten | G06Q 10/107 |
| 9,747,384 B1 * | 8/2017 | Rao | G06F 16/972 |
| 11,694,278 B2 * | 7/2023 | Goenka | G06Q 50/01 |
| | | | 707/734 |
| 2006/0248573 A1 * | 11/2006 | Pannu | H04L 63/08 |
| | | | 726/1 |
| 2008/0027924 A1 * | 1/2008 | Hamilton | G06F 16/9535 |
| | | | 707/999.005 |
| 2010/0324970 A1 * | 12/2010 | Phelon | G06F 16/9535 |
| | | | 707/769 |
| 2013/0080911 A1 * | 3/2013 | Klemm | G06F 16/958 |
| | | | 715/745 |

(Continued)

Primary Examiner — Noosha Arjomandi
(74) Attorney, Agent, or Firm — Mark K. Young; Mark Young PC

(57) ABSTRACT

A cloud-based personalization service utilizes a personalization model providing service users with tools to create, personalize, and manage their own user profiles, which are abstracted in the form of "personas," that can learn from, and be shared across, different ecosystems of online services and applications. One or more personas may be locally instantiated on the user's various computing devices by a personalization system. The personalization service and system interoperate to enable users to set operating parameters, preferences, and content-filtering criteria for their personas. Users can strictly control the information and parameters that their personas expose to the services and applications to protect user privacy and enhance the quality of online interactions. The personalization model facilitates personalization of the user's personas to individual online services and applications based on context-awareness to further improve the relevance of delivered content and user experiences.

20 Claims, 23 Drawing Sheets

(56) References Cited

U.S. PATENT DOCUMENTS

| | | | | |
|---|---|---|---|---|
| 2016/0182658 A1* | 6/2016 | Allinson | ............... | H04L 67/306 |
| | | | | 709/224 |
| 2017/0242886 A1* | 8/2017 | Jolley | ................... | G06F 40/211 |
| 2017/0243107 A1* | 8/2017 | Jolley | ...................... | G06N 5/02 |
| 2018/0026983 A1* | 1/2018 | Jain | ..................... | H04L 63/0884 |
| | | | | 713/185 |
| 2019/0302975 A1* | 10/2019 | Rydzewski | ......... | G06F 16/9535 |
| 2020/0117759 A1* | 4/2020 | Goenka | .................. | H04L 51/52 |
| 2020/0167699 A1* | 5/2020 | Cohen | ..................... | H04L 51/52 |
| 2020/0233910 A1* | 7/2020 | Bhide | ..................... | G06F 40/40 |
| 2020/0364282 A1* | 11/2020 | Kent | ................ | G06F 16/90332 |
| 2022/0070121 A1* | 3/2022 | Stoehr | ................ | G06Q 30/0269 |
| 2023/0118127 A1* | 4/2023 | Ramasamy | .......... | H04B 7/0691 |
| | | | | 375/267 |
| 2023/0124530 A1* | 4/2023 | Nuki | ................ | G06Q 30/0201 |
| | | | | 705/14.23 |
| 2023/0274155 A1* | 8/2023 | Marok | ................... | G06N 3/045 |
| | | | | 706/25 |
| 2023/0409650 A1* | 12/2023 | Kumar | ............... | G06F 16/9535 |

\* cited by examiner

600

1100

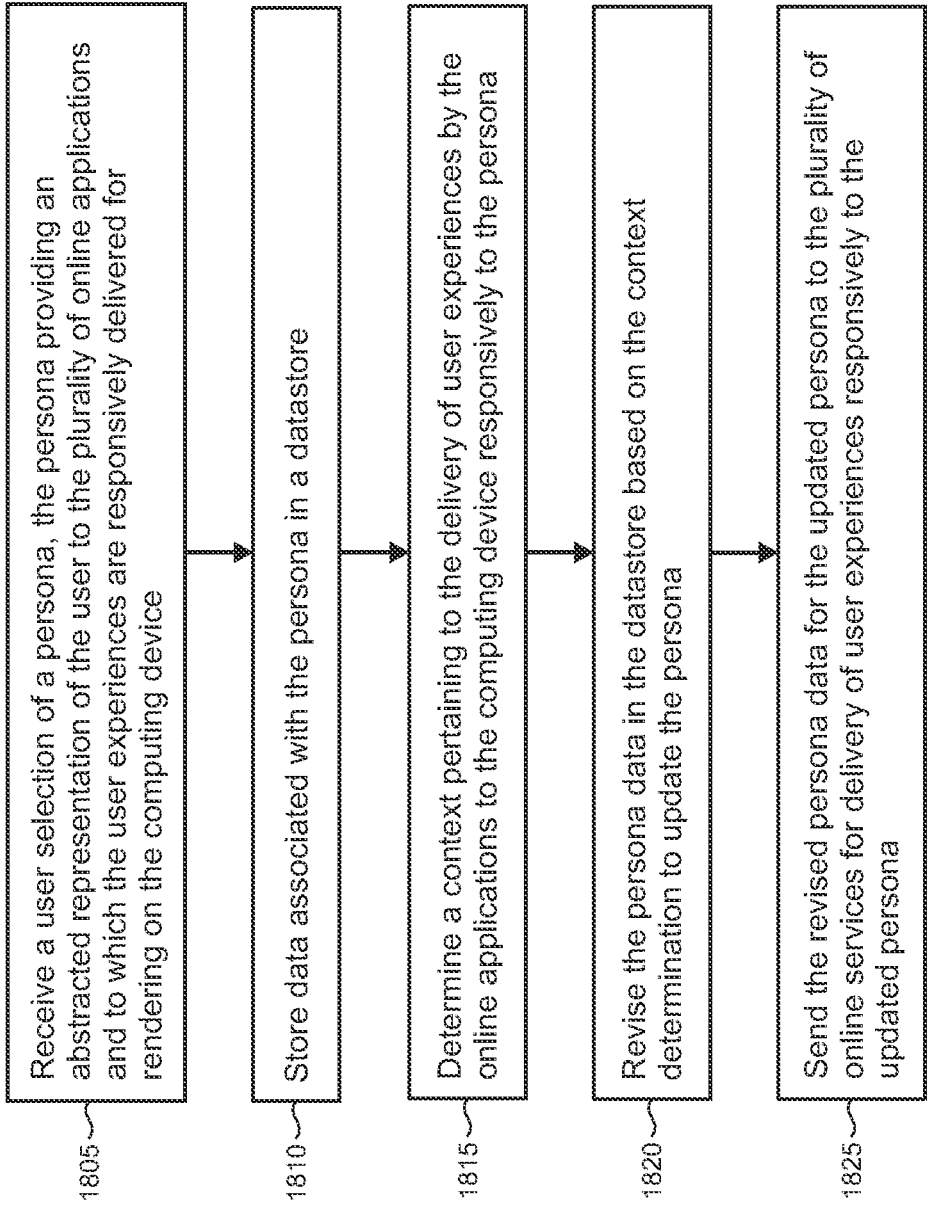

SHARABLE PRIVACY-ORIENTED PERSONALIZATION MODEL

BACKGROUND

Online services and applications may employ user profiles to facilitate user navigation to desired content and resources and delivery of appropriate user experiences. A user profile may be built and developed based on information explicitly provided by a user (e.g., user preferences) as well as information that may be obtained by observing interactions with the online services and applications (e.g., user behaviors). Typically, each online service and application will individually build, develop, and control the profiles of its users.

SUMMARY

A personalization service operable on a computing device such as a cloud network-based server utilizes a personalization model providing service users with tools to create, personalize, and manage their own user profiles, which are abstracted in the form of "personas," that can learn from, and be shared across, different ecosystems of online services and applications. One or more personas for a user may be locally instantiated on each of the user's various computing devices by a personalization system implemented, for example, as a browser or operating system extension, or as a standalone application.

The personalization service and system interoperate to enable users to set operating parameters, preferences, and content-filtering criteria for their personas. Users can strictly control the information and parameters that their personas expose to the services and applications to protect user privacy and enhance the quality of online interactions. The personalization model facilitates personalization of the user's personas to individual online services and applications based on applicable context such as application/service type or category, user and computing environments, usage history, etc. The context-awareness of the personalization model can further improve the relevance of delivered content and user experiences.

Utilization of the present personalization model advantageously provides technical improvements to the operations of the underlying physical computing infrastructure on which the model operates. Sharing a user's persona across ecosystems reduces training of online services and applications on an individualized basis while learning about the user when building a profile. Personas can be adapted and updated to more accurately represent a user profile based on collective learning across different ecosystems. The learned parameters may be approved by the user and then passed to the individual online services and applications. The shared personalization thus enables network bandwidth utilization and power consumption to be optimized in computing devices employed by the personalization service and user (some of which may be battery powered) by reducing duplicative training and learning across ecosystems.

Personas under the present personalization model may be utilized to establish identity for a user for online service and application authentication and authorization processes executed on the user's computing devices. Security and protection of user privacy is enhanced for identity scenarios because personas are directly controlled and managed by the user and not by the online services or applications. Identity can thus be established under terms that are set by the user without oversharing information that is unnecessary for authentication and authorization and which the user may wish to keep private.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIGS. 18, 19, and 20 are illustrative methods that may be utilized to implement various aspects of the present sharable privacy-oriented personalization model;

Like reference numerals indicate like elements in the drawings. Elements are not drawn to scale unless otherwise indicated.

DETAILED DESCRIPTION

Figure 1:
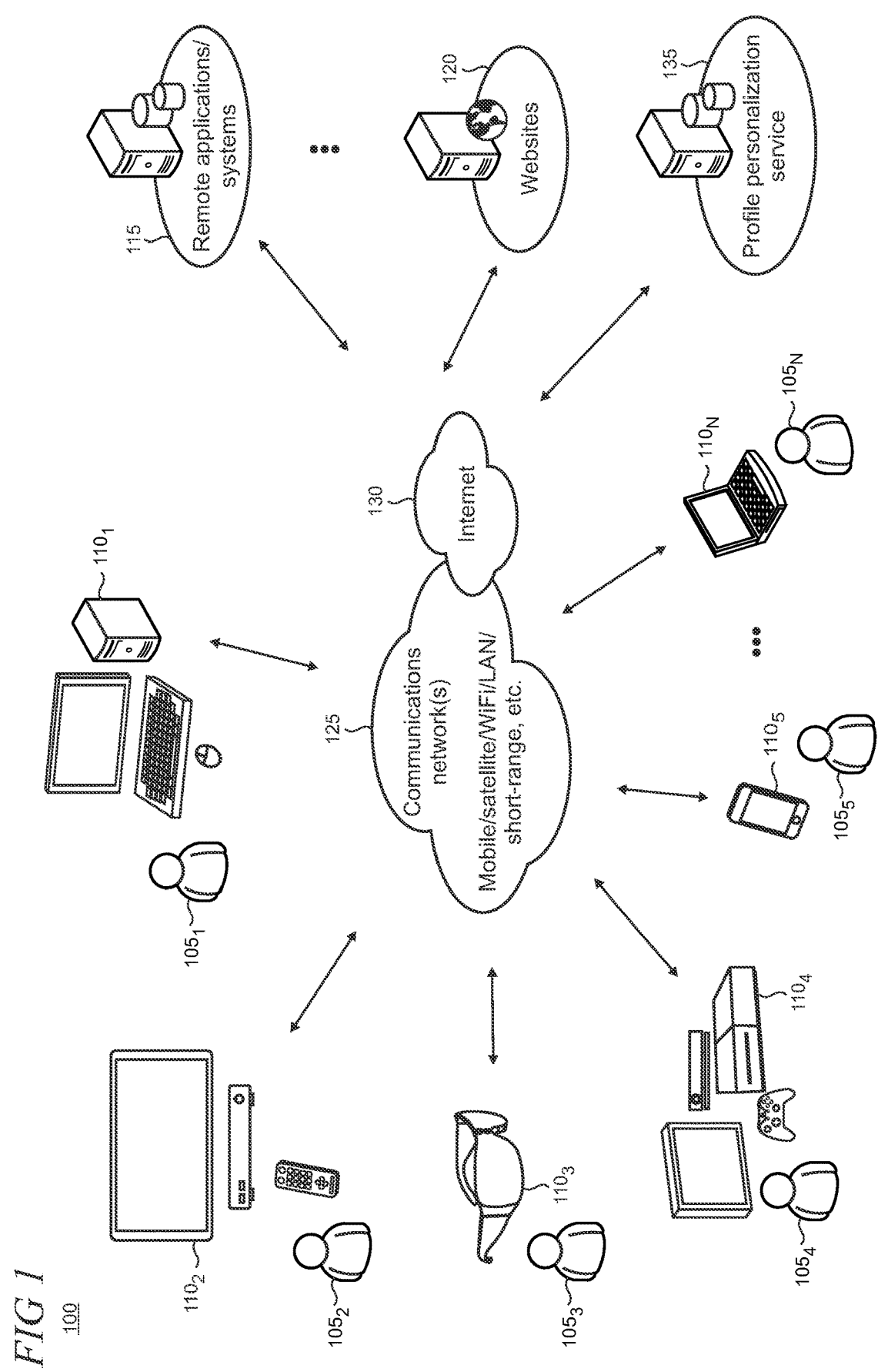
FIG. 1 shows an illustrative computing environment in which computing devices can communicate and interact with various services, systems, and websites over a communications network.

Computing device users may wish to represent and express themselves differently when engaging with online services and applications (collectively referred to herein as applications) depending on the particular context of their online activities. Such activities may include, for example, content experiences, shopping and e-commerce, cloud-computing, and social networking. Content experience applications may include, for example, streaming services, video sharing, on-demand music and video, online gaming, blogs and feeds, and the like. For content experience applications, common goals of online users include being informed about news and items of personal interest, being entertained with content that can fill available time, or being enriched by learning something new, improving a skill, or furthering a hobby. Users may have accounts with multiple different content experience providers to achieve a desired breadth of applications and associated user experiences.

Content experience applications can create user profiles based on a customer/user dataset that may include basic information such as demographic and location data to establish account identities for the users (i.e., who they are). The user profile is then typically adapted to a user based on observations of user behaviors while using the content experience applications (i.e., what they are doing). Applications may also utilize data from external sources to supplement identity and behavior data when creating and adapting user profiles.

User profiles created and adapted by content experience applications can provide satisfactory results in meeting users' goals in some cases. However, users may desire to exercise more control over their online profiles and personalize them, for example, to make it faster and easier to discover and access relevant content experiences without oversharing information that may compromise user privacy and security. In addition, it is not unusual for customers to churn through content experience providers so that new applications are regularly brought on and old applications canceled. Since user profiles are tied to specific content experience applications, users may need to spend time and effort to train each new application that uses behavior-based adaptation to reach a point where the application behaves in a satisfactory manner. For example, the content recommendation algorithms used by an application may need to be exposed to a relatively large amount of behavior data to function effectively and capture an accurate scope of a user's interests.

The present sharable privacy-oriented personalization model introduces a new paradigm for user profiles for online activities using personas that are owned and controlled by the user rather than by the application provider. The user's persona embodies particular aspects of the user's personality or character they choose to reveal for which a high degree of personalization is available under the model. The personalization model incorporates ownership, transparency, and consent as fundamental principles so that personas are sharable across various content experiences and other online applications while maximizing protection of user privacy. Users are provided with explicit control over privacy parameters that are used in the personalization model.

The sharable personas operate as a single source of user identity and preferences across online ecosystems and various computing devices associated with a user to expose sufficient data to enable effective engagement with content experience applications without oversharing unnecessary information. Personas can be flexibly deployed based on applicable context with a particular application or ecosystem so that only relevant data in the persona is shared as needed to support that application's offering while data that is irrelevant to the application is suppressed.

Profile and preference data informing a persona may be summarized and shared with new applications in the form of an abstract to overcome known issues in "cold start" scenarios. Abstracts may be tailored to applications based on applicable context in some cases to maximize privacy protection. For example, an abstract provided to a children's television streaming application could be different from the abstract provided to a healthcare blogging application to minimize oversharing of irrelevant data. New applications can use the abstract to quickly learn user preferences to shorten adaptation time. This feature benefits both application providers and users by helping to ensure accurate capture of preferences to ensure that more relevant content and user experiences are provided while reducing the training burden on users. Existing applications can use personas to refine and optimize their offerings, for example, as personas are generally dynamic objects and can change over time and across various contexts.

The personalization model is fundamentally based on transparency so that users can observe and control the data that is exposed by their personas during use with existing applications and in cold start scenarios. Users can control parameters for persona sharing using, for example, whitelists (personas are shared with whitelisted applications) and blocklists (user profiling may default to conventional methodologies for blocklisted applications). Notice is provided when content experience applications request access to personas and users are able to grant or deny access. For persona evolution through collective learning scenarios, notice is provided, and user consent is requested when a content experience application seeks to contribute new data to the user's persona. The user can inspect the data offered by the application and select data elements for inclusion or exclusion.

The personalization model further supports user actions to control and shape persona data such as, editing, adding, deleting, and hiding data, for example. Data may also be imported from other applications or data sources. Users can control privacy parameters by setting specific inclusion/exclusion rules for persona data or by selecting compartmentalization of persona data based on application type or category. Compartmentalization provides for persona isolation among applications to limit cross-application profiling and boost privacy and security. Thus, for example, some persona data is not shared with certain applications (e.g., user medical data is restricted from news applications), while other data is shared (e.g., sharing shopping preference data with all applications is allowed). To implement compartmentalization, the personalization model can enable a persona to be modified or adapted for each application. Alternatively, multiple persona instances may be utilized in which a unique persona is dedicated to each application to thereby enable the user to differentiate online presence across applications.

Content-based filters may also be utilized in personas to enable users to specify categories, types, and instances of content and user experiences to be blocked from presentation by applications. For example, a user may wish to block videos surfacing particular topics or themes. The user can specify filtering criteria and/or select from preset filters to screen content for anything that might be objectionable to the user or have limited relevance to an applicable context. The filtering may be implemented using variable granularity. Entire categories of content can be filtered (e.g., politics, violence, profanity, nudity) from a user experience, sub-categories (e.g., graphic portions of a war movie or game) can be targeted, or individual pieces of content or user experiences can be filtered (e.g., skip certain television scenes, block/mute certain words).

Content-based filters can also be utilized in personas to enable users to set parameters for identifying content and user experiences from applications that are of interest. For example, the user can configure their persona to interact with applications to surface recommendations for dog care content. Thus, content filters can be utilized to both block and find particular categories, types, and instances of content and user experiences. The content filtering exposed by a persona can be personalized to the user by ingesting user-specified keywords, maintaining context-awareness, or using other suitable mechanisms to enable the user to avoid content and experiences that can trigger distress or be otherwise inappropriate and be presented with the content and experiences they desire. The personalization model may also enable users to set parameters for utilization of collaborative filtering by applications in some implementations.

Variations of personas can be implemented for singular or simultaneous use by blending or morphing personas under the personalization model. Such variations can provide flexibility to users to find personas that best serve their interests and expectations. Users can experiment and try different personas or combinations of personas to discover different content and user experiences. Users can set the breadth of the variations to meet their particular needs. For example, a slimmed down persona might be used for when trying out a new application to test the application with a small amount of data and the results observed before changing or broadening the profile. Persona histories can be maintained under the personalization model to enable users to revert back to other personas in their history if desired. Users can also utilize multiple different personas that can be alternatively deployed based on applicable context or other criteria.

A persona may be configured to learn from interactions with content experience applications across diverse ecosystems so that the persona can evolve with more accurate and updated personalization based on a larger and more complete dataset. Parameters controlling how learning is implemented may be controlled by the user. Each application can tailor its offerings to the evolved persona to stay current with the user's preferences, which themselves can shift over time, without having to individually duplicate the collective learning. The result is strengthened engagement between users and content experience applications.

Turning now to the drawings, FIG. 1 shows an illustrative computing environment 100 in which the same or different users 105 may employ computing devices 110 that can communicate with other devices and various remote or cloud-based applications or systems 115 and websites 120 over a communications network 125. The network can include any of a variety of network types and network infrastructure in various combinations or sub-combinations including mobile networks, cellular networks, satellite networks, IP (Internet-Protocol) networks such as Wi-Fi under IEEE 802.11 and Ethernet networks under IEEE 802.3, a public switched telephone network (PSTN), and/or short-range networks such as Bluetooth® networks. The network infrastructure can be supported, for example, by mobile network operators, enterprises, Internet service providers (ISPs), telephone service providers, data service providers, cloud service providers, and the like.

The network 125 may utilize portions of the Internet 130 or include interfaces that support a connection to the Internet so that the computing devices 110 can access content and render user experiences provided by various remote or cloud-based applications 115 and websites 120. The applications and websites can support a diversity of features, services, and user experiences such as social networking, content experiences, mapping, news and information, entertainment, travel, productivity, finance, etc. The computing environment 100 also supports a personalization service 135 that is described in more detail below The computing devices 110 can support data-consuming applications such as Internet browsing and multimedia (e.g., music, video, etc.) consumption in addition to various other features. The computing devices 110 may include, for example and not as a limitation, mobile phones, smart-phones, personal computers (PCs), tablet PCs, laptop PCs, virtual- and mixed-reality head-mounted display (HMD) devices, or other wearable display devices, multimedia devices, and game consoles.

Figure 2:
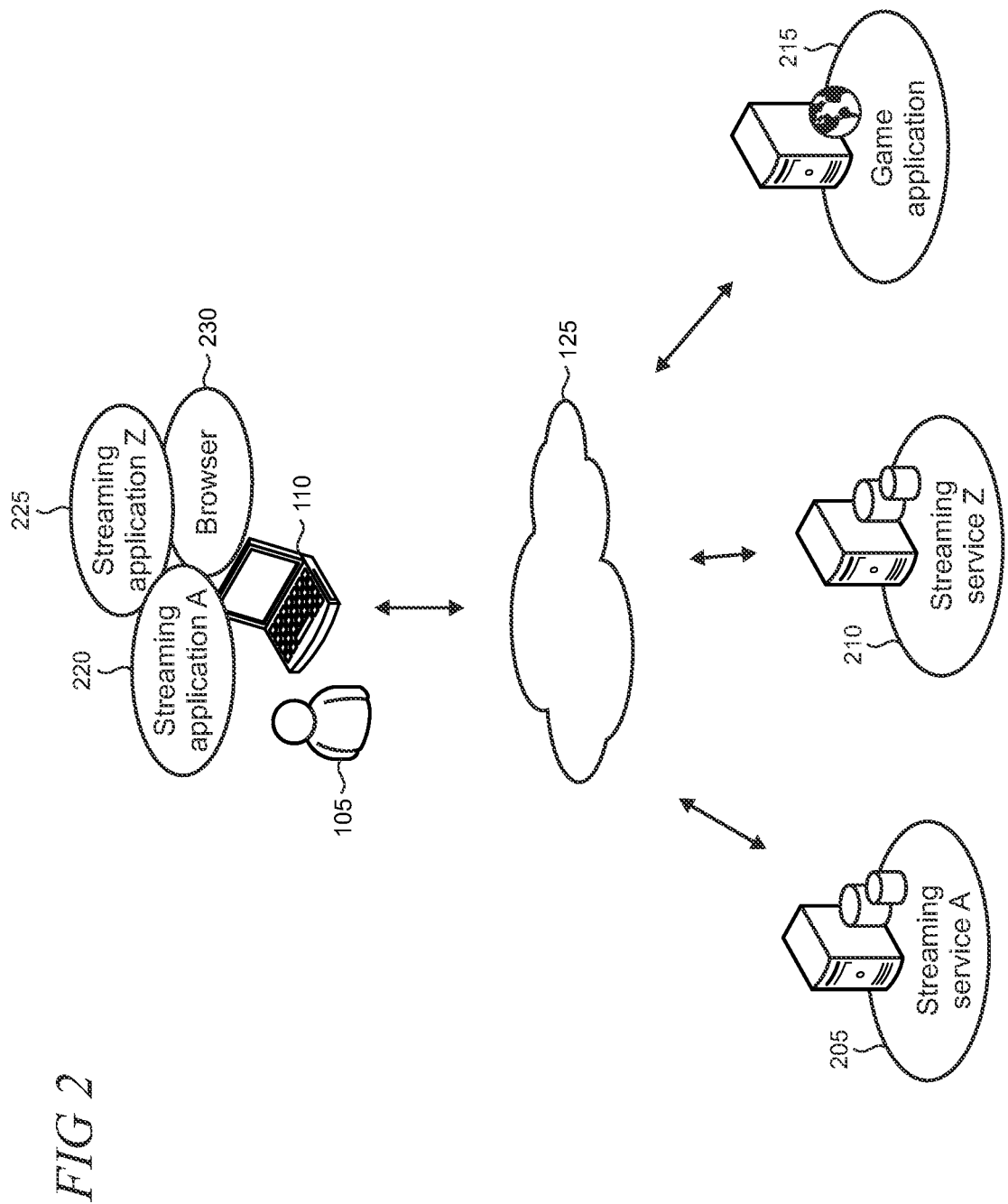
FIG. 2 shows an illustrative computing device interacting with different applications over a communications network.

FIG. 2 shows an illustrative computing device 110 interacting with different applications over the communications network 125. In this example, the applications include two different streaming services 205 and 210 and a game application 215. It is emphasized that the streaming services and game application are examples to illustrate relevant background and context for the present principles. The present personalization model is not limited to streaming services and game applications. It may be appreciated that the personalization model may be adapted for use with various online services and/or applications including, for example but not limited to, social media/networking, on-demand services, cloud-computing, e-commerce, news and entertainment, finance, sports, hobbies, recreation, education, and the like.

The computing device 110 supports various applications performing at least some local code-execution that may include streaming applications 220 and 225 that are configured to respectively interact over the communications network 125 with the streaming services 205 and 210. In this example, the user 105 employs a browser application 230 to interact with the game application 215. It may be appreciated that some content experience applications (which may be included as parts of the streaming services 205 and 210) may be configured to be accessible using either or both a general purpose browser and a standalone application. Other online services and applications may be similarly configured such that the user experiences they provide may be supported in the browser 230.

Figure 3:
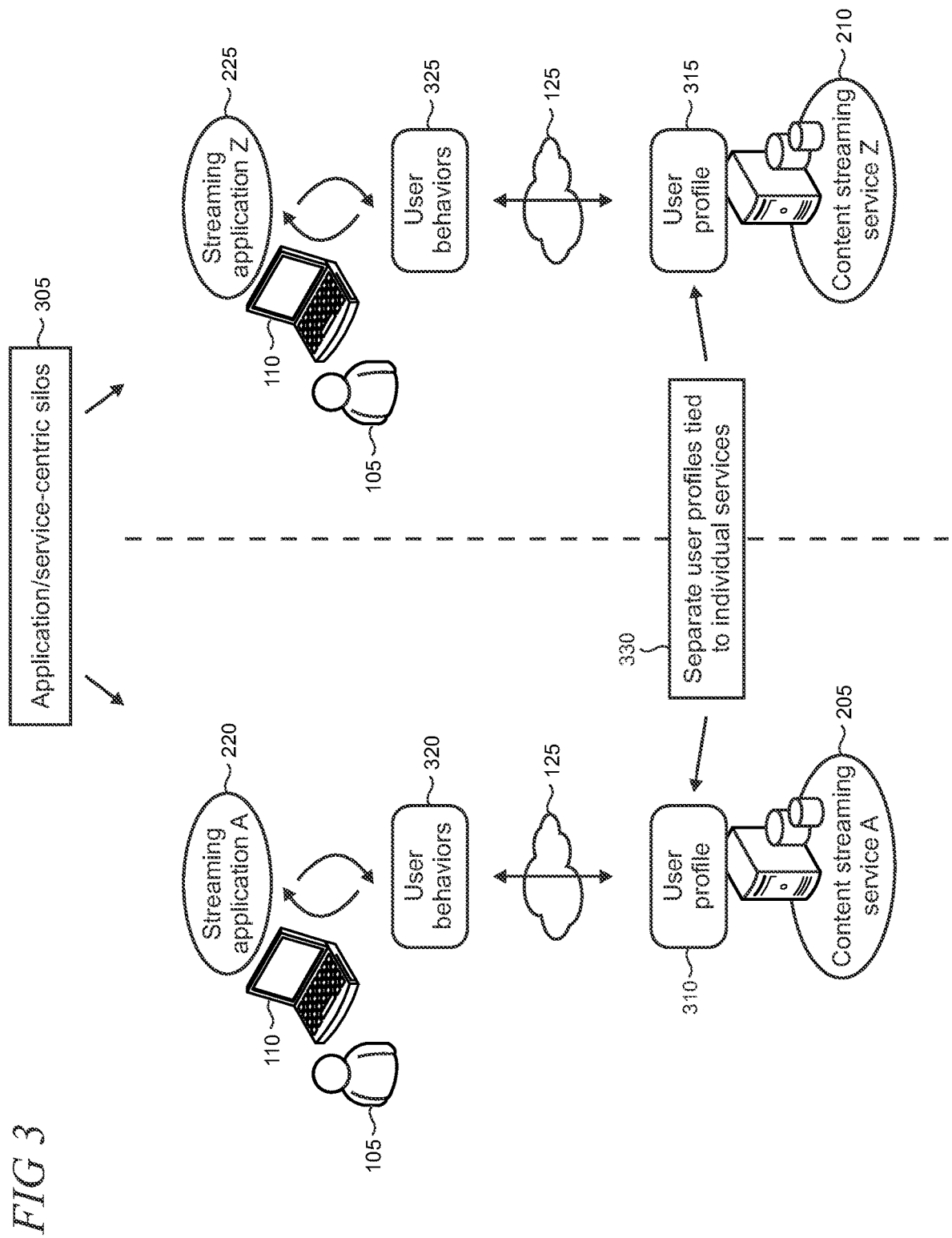
FIG. 3 shows an illustrative scenario in which applications are arranged in separate silos and maintain individual user profiles in one-to-one relationships with users.

As indicated by reference numeral 305 in FIG. 3, conventional interactions between a computing device 110 and streaming services 205 and 210 are typically implemented in application/service-centric silos. The interactions associated with each service are isolated and separated. Each streaming service will typically create a respective user profile 310 and 315 that is adapted to the user 105 based on observations of user behaviors 320 and 325 with its application. As indicated by reference numeral 330, each user profile 310 and 315 is separate and tied to its respective streaming service 205 and 210 which generally owns and controls the profiles.

Some online applications may provide visibility by the user into the user profile data that they maintain, but such visibility is typically limited. Online applications may also enable some user control over the composition of a user profile and the data it exposes. However, online application providers may be motivated to limit transparency and user control over profile data in an effort to gain and maintain maximum user attention. For example, an application's recommendation and curation algorithms may favor user behavior data over identity data. The effect of application/service-centric silos and reliance on behavior data is that users may become trapped in a feedback loop in which their tastes and preferences, which may evolve over time and differ based on applicable context, are not adequately reflected in the user experiences that they are provided. Users may become dissatisfied with the application in such scenarios which may increase churn.

Figure 4:
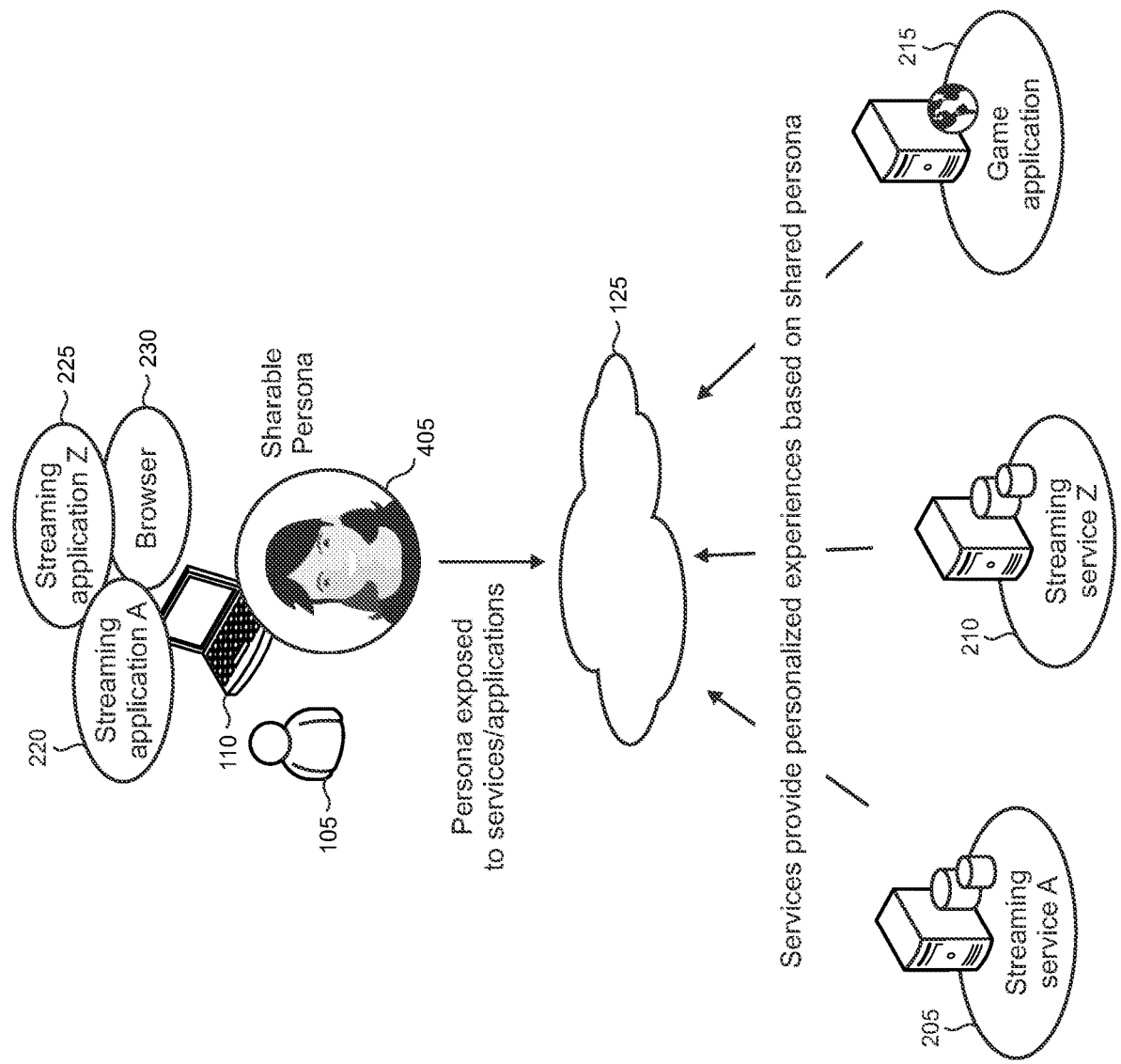
FIG. 4 shows an illustrative sharable persona that is exposed to different applications.

The issues noted above from the silo effect may be addressed by the present personalization model. As shown in FIG. 4, the personalization model supports a user profile personalization paradigm that is different from the conventional user profile that is owned and maintained by an application. The paradigm is implemented using sharable persona 405 that is exposed to online applications 205, 210, and 215. By being sharable across applications, utilization of the persona breaks with the silo model discussed above with reference to FIG. 3. The personalization paradigm is further distinguishable over conventional user profiles because users, and not the application providers, own and control their personas.

Figure 5:
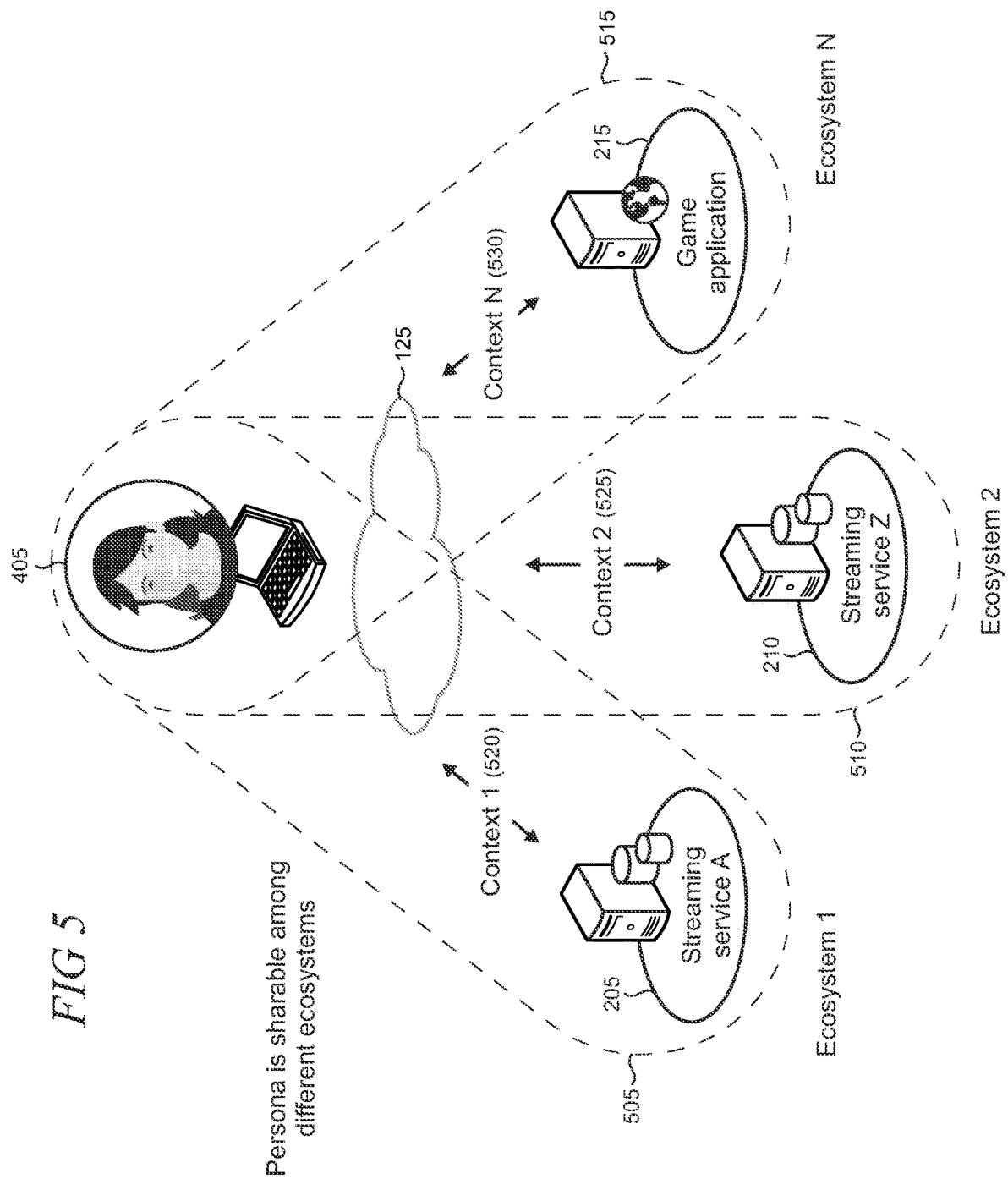
FIG. 5 shows an illustrative arrangement of ecosystems each having a unique context for personalization in which a user's persona is sharable across ecosystems.

Instead of silos, the sharable persona 405 supports distribution of user preferences and other data across ecosystems as shown in FIG. 5. An ecosystem is defined by the context that is applicable to the user's interactions and relationship with a particular application. FIG. 5 includes three illustrative ecosystems 505, 510, and 515 that are respectively implemented between the user's persona 405 exposed on the computing device 110 and the streaming services 205 and 210 and game application 215. The unique context for each ecosystem is respectively indicated by reference numerals 520, 525, and 530.

The ecosystem context may be monitored for use by either or both the personalization model and services in some implementations. For example, the personalization model can use context to determine the kinds of data that are exposed by the persona 405 to the applications to minimize oversharing and maximize user privacy. The applications can use context to map content and user experiences to the persona to increase the relevancy of delivered content and user experiences. With notice to the user and consent, context-awareness may be implemented by collecting information from the computing and physical environments using hard sensing (i.e., raw physical data about the user such as location) or soft sensing (i.e., information about the user such as preferences and social graphs). For example, collecting context data may include using computing device sensors, monitoring user behaviors and interactions with the device and applications, accessing external data sources and systems, and the like.

Figure 6:
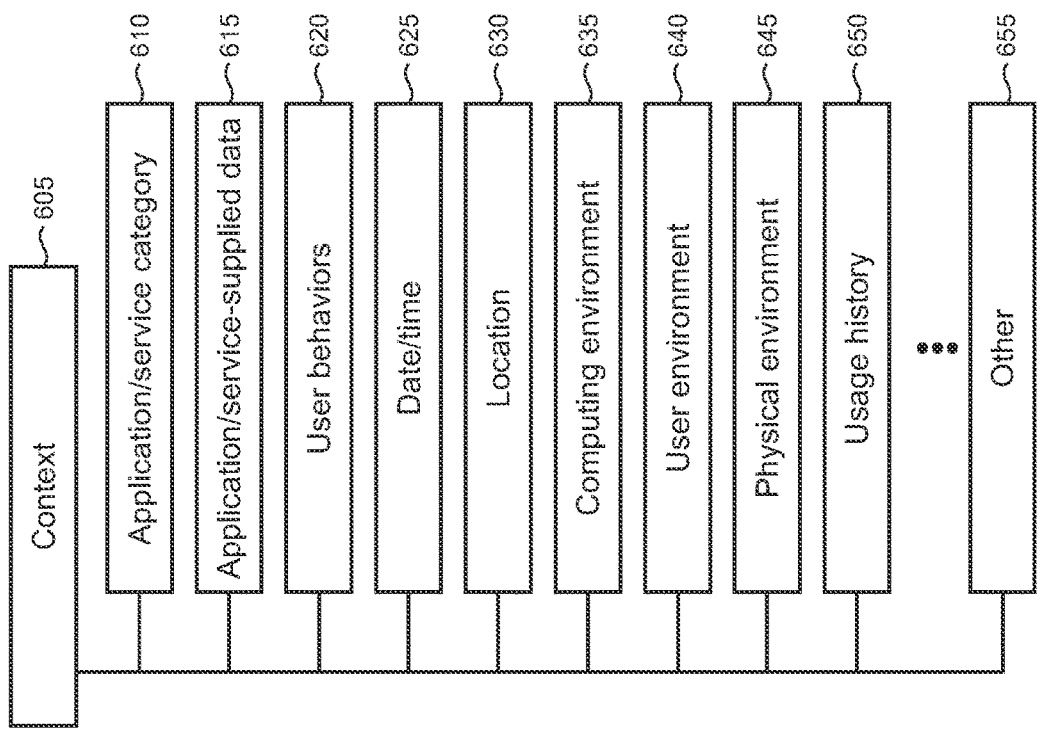
FIG. 6 shows an illustrative taxonomy of context that may be considered when exposing user data in a persona and when mapping data from online applications to a user's persona.

The amount and kind of contextual data utilized in a given implementation of the present principles can vary. FIG. 6 is an illustrative taxonomy 600 that lists some examples of context 605 that may be utilized by the personalization model and/or services/applications 205, 210, and 215. The examples are not exhaustive, may overlap, and not all the examples need to be utilized. As shown, types and categories of context may include: service/application category or type 610 (e.g., content experience, social networking, shopping, etc.); data 615 that may be supplied by the service/application (e.g., content, metadata, etc.); user behaviors 620; date and/or time 625; computing device location 630; computing environment 635 (e.g., available processors, devices accessible for user input, display, peripherals, network capacity, network connectivity (cellular, Wi-Fi, LAN), etc.); user environment 640 (e.g., whether at home or work, with friends, co-workers, or family, etc.); physical environment 645 (e.g., lighting and noise level); usage history 650 (e.g., usage of computing devices and services/applications); and other suitable context categories 655.

Figure 7:
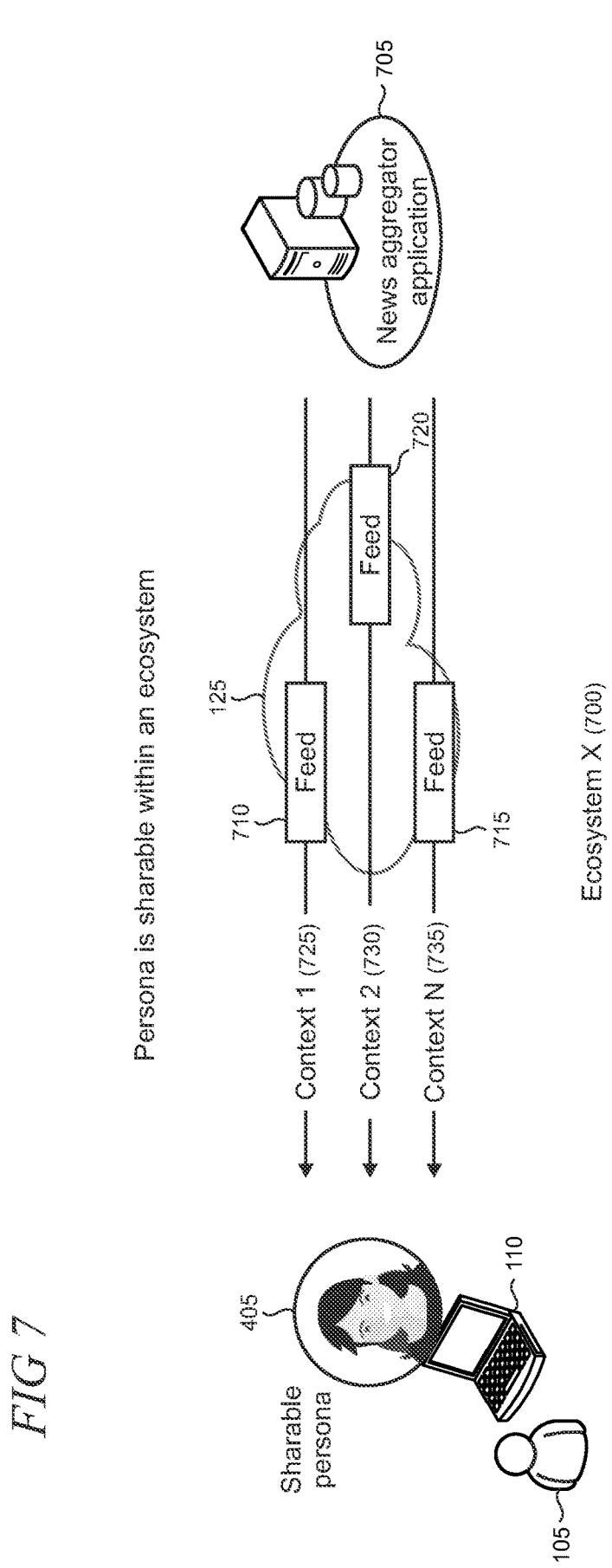
FIG. 7 shows an illustrative persona that is shared within an ecosystem.

Context-awareness of the personalization model may also be utilized within single ecosystems. For example, FIG. 7 shows an ecosystem 700 that is defined by context surrounding interactions between a persona 405 and an application 705 that provides multiple streams or content feeds 710, 715, and 720. The application is a news aggregator in this example. While the application may be operated by a single entity or provider, the respective context 725, 730, and 735 of the feeds may differ. For example, the user 105 may read the feeds at different times and/or at different locations. The subject matter of the feeds can vary as well.

Figure 8:
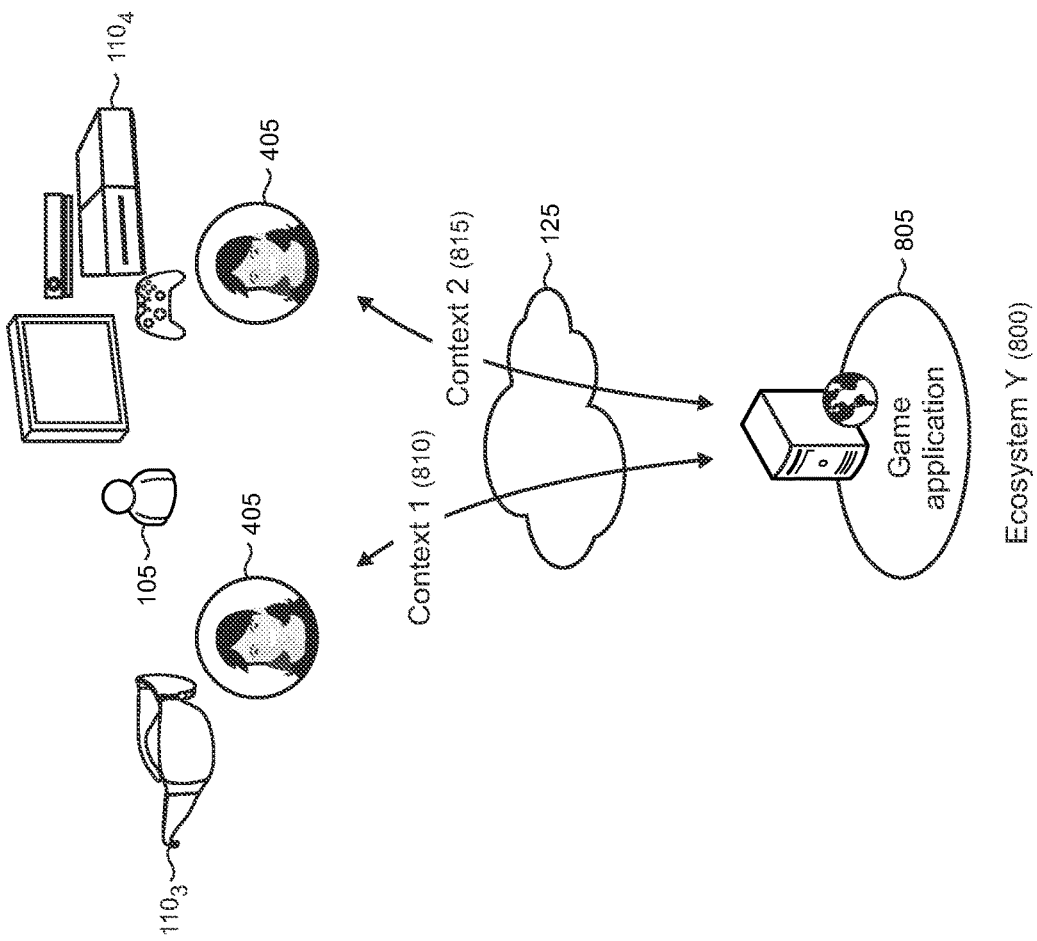
FIG. 8 shows an illustrative persona that is shared between diverse computing platforms within an ecosystem.

FIG. 8 shows an ecosystem 800 in which the user 105 engages with a game application 805 using different computing devices 110 including a head-mounted display device supporting virtual reality experiences and a multimedia console. The persona 405 is sharable across the computing devices. The context 810 and 815 associated with the user's game experiences can differ because, for example, the computing devices have different capabilities, and the game experiences may vary.

Figure 9:
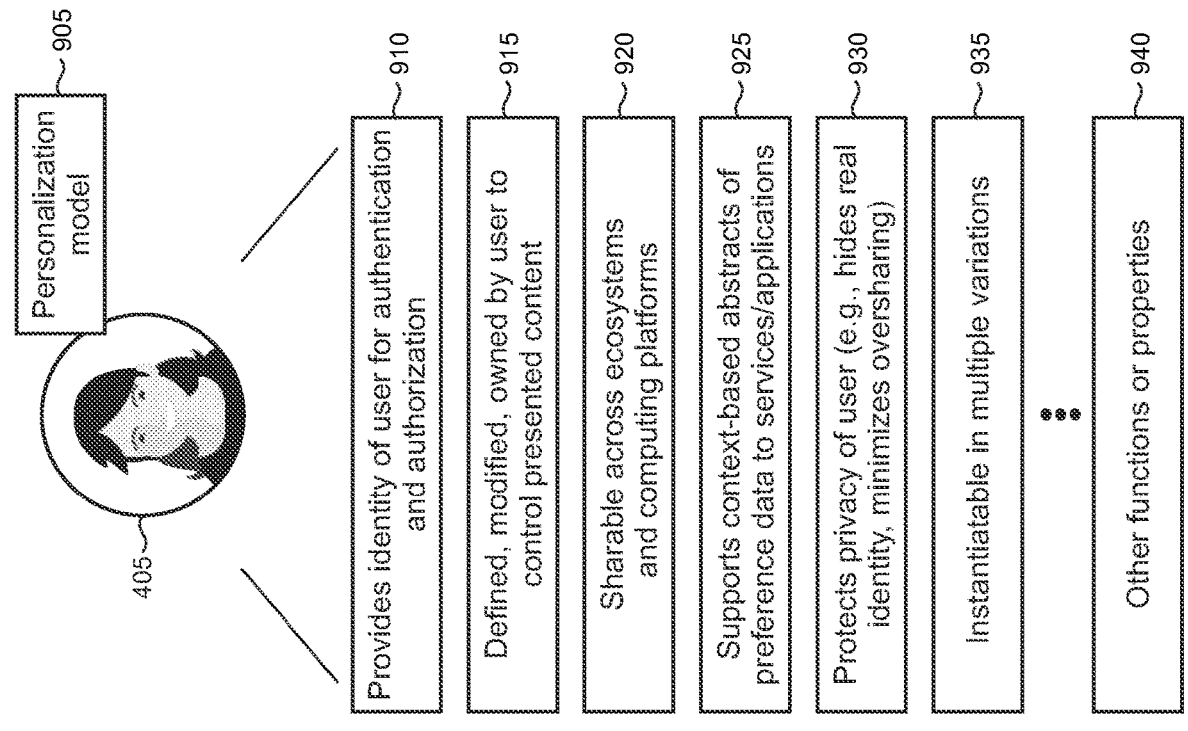
FIG. 9 shows a personalization model that describes illustrative features and functions supported by a persona when implemented according to the present principles.

FIG. 9 shows a personalization model 905 that describes illustrative features and functions supported by a persona 405 when implemented according to the present principles. The features and functions exposed by the model are illustrative, may overlap, and do not comprise an exhaustive listing. Not all of the features and functions need to be utilized in every implementation of the personalization model. As shown at block 910, the personalization model 905 can enable the persona 405 to function as an identity for the user, for example, when authentication and authorization processes are preformed attendant to instantiation and execution of an application in a given ecosystem.

At block 915, the personalization model 905 enables the persona 405 to be defined, modified, and owned by the user, and not by applications as with conventional user profiles. This feature enables users to shape persona data, set and apply content filters for blocking and/or emphasis, compartmentalize the persona, and blend/combine/morph personas to enable full control over the content and user experiences presented by applications.

At block 920, the personalization model 905 enables the persona to be sharable across ecosystems which may include various combinations of computing devices and applications in various contexts. At block 925, the personalization model 905 enables abstracts of profile and preference data informing an abstract, which may be context-based in some cases, to be provided to applications.

At block 930, the personalization model enables the persona 405 to protect the privacy of the user, for example, by hiding the user's real identity and minimizing sharable persona data to avoid oversharing. At block 935, the personalization model 905 enables a persona 405 to be instantiated in multiple variations that may be used singly or simultaneously. Other features and functions may be exposed by the personalization model to meet the needs of a particular implementation, as indicated at block 940.

Figure 10:
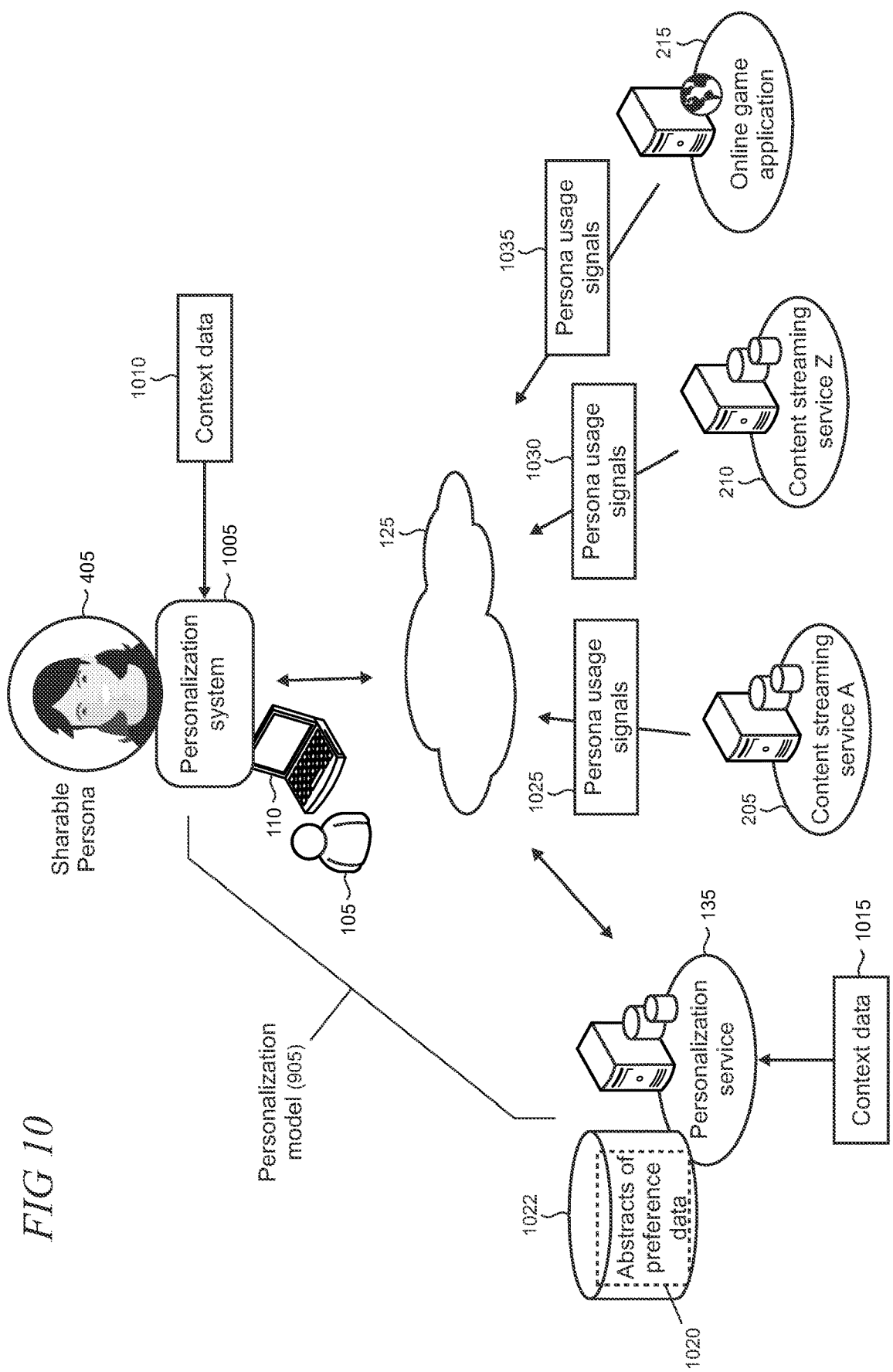
FIG. 10 shows an illustrative personalization model that spans a personalization system and a personalization service.

FIG. 10 shows illustrative inputs to the personalization model 905 that may be implemented, for example, to span a personalization system 1005 that is locally operable on a computing device 110 and a remotely-operable personalization service 135. The personalization system and service are typically configured to work in a complementary manner in a client-server arrangement. However, in some implementations, the system and service can operate separately. In some implementations, the personalization model can be completely locally implemented or completely remotely implemented. The particular split of functions and responsibilities between the personalization service and system can vary to meet particular requirements. As shown, each of the personalization system and service can be configured to utilized context data, as respectively indicated by reference numerals 1010 and 1015.

The personalization service 135 stores abstracts 1020 of preference data in a suitable datastore. Abstracts may be implemented as JSON (JavaScript Object Notation) objects. The persona 405 and abstracts 1020 may be configured to be dynamic and modifiable based on inputs from the user 105, context 1010 and 1015, and persona usage signals 1025, 1030, and 1035 that are respectively provided by streaming services 205 and 210 and game application 215. The persona usage signals reflect how the applications interact with the persona within their own individual context and ecosystems. The persona usage signals can supplement content and data supporting user experience, for example, and may be implemented using out-of-band (OOB) signaling. The persona can apply the usage signals to current interactions, for example, to trigger application of a content filter.

Figure 11:
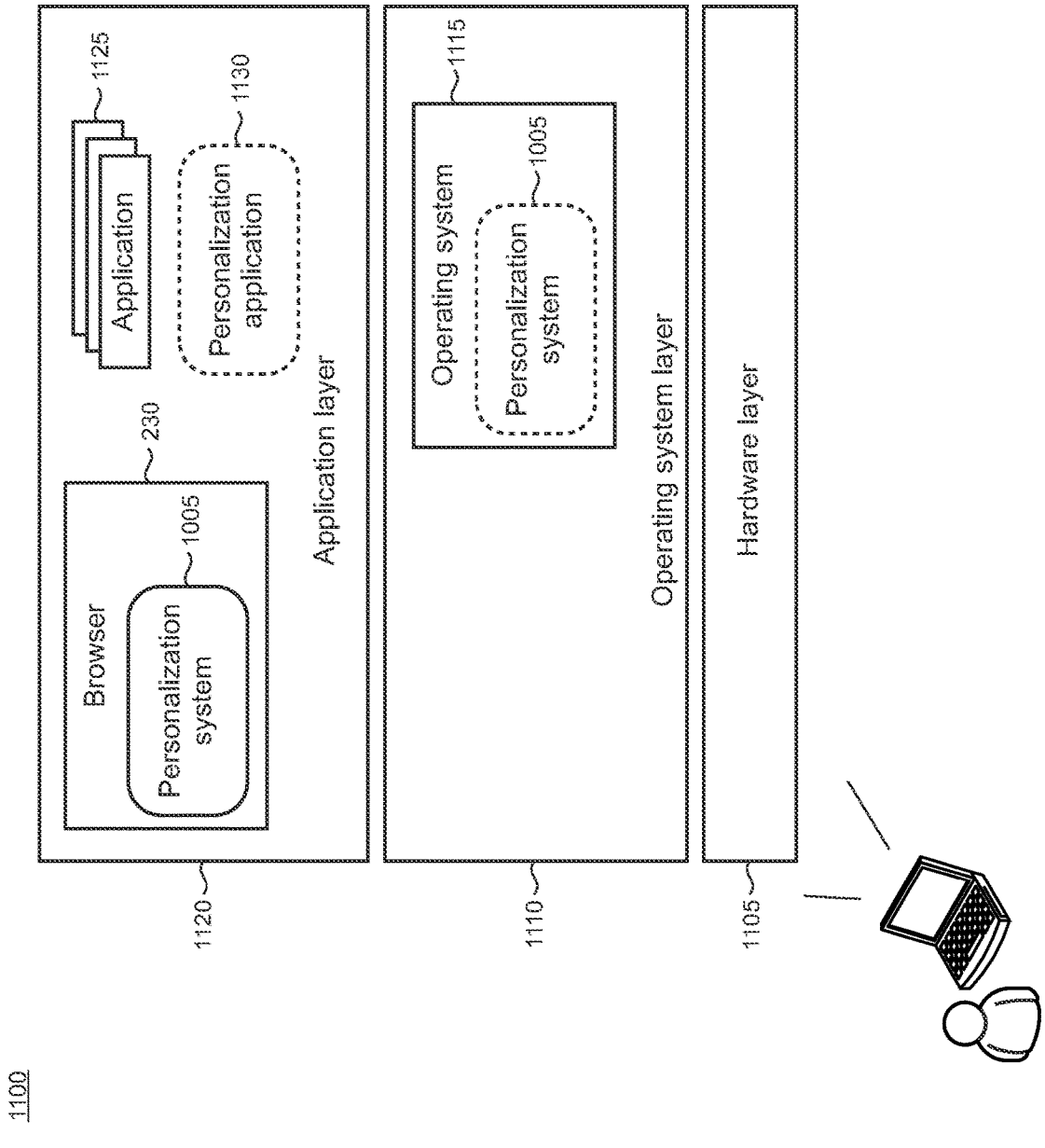
FIG. 11 shows an illustrative software architecture that may be implemented on a computing device that includes components that support a personalization system that is arranged in accordance with the present principles.

FIG. 11 shows an illustrative software architecture 1100 that may be implemented on a computing device 110 that includes components that support a personalization system 1005 that is arranged in accordance with the present principles. The architecture includes three layers—a hardware layer 1105 which provides an abstraction of computing device hardware, an operating system layer 1110 that supports an operating system 1115, and an application layer 1120 that supports a browser 230 and various applications 1125.

In this illustrative example, the personalization system 1005 is incorporated as an extension or feature of a browser 230 which may be desirable in some implementations due to the browser's ubiquity and being generally supportable by different online applications even when standalone applications may also be utilizable. However, the personalization system can be optionally implemented (as indicated by the dashed lines) in either an extension or function provided by the operating system 1115 or as a standalone application 1130 in the application layer. It may be appreciated that the software architecture 1100 may vary in execution and design depending on characteristics and capabilities of a particular computing device.

Figure 12:
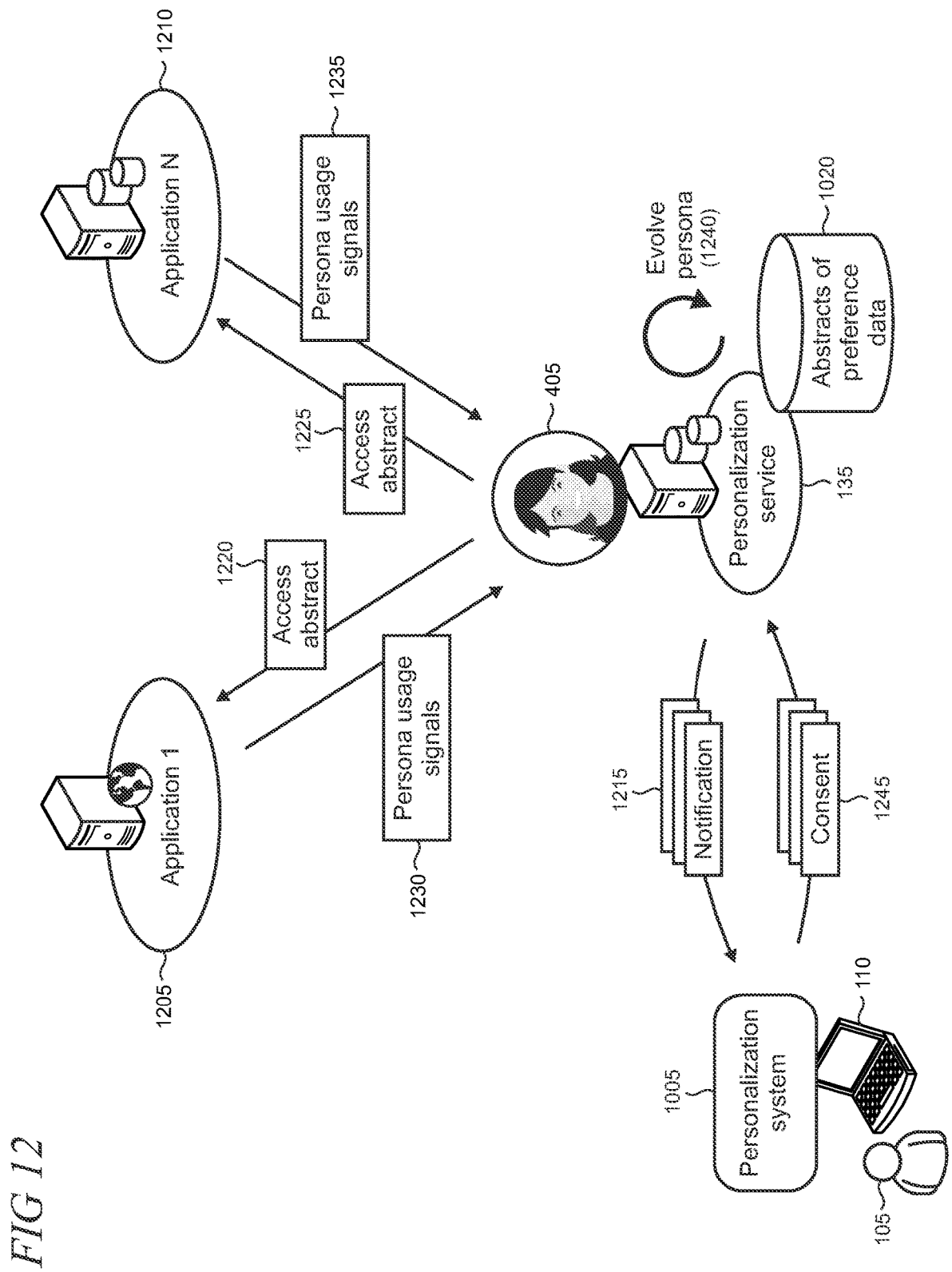
FIG. 12 shows interactions among online applications and an illustrative personalization service.

FIG. 12 shows interactions among an online application 1205, online application 1210, and an illustrative personalization service 135 (it is noted that a communications network is omitted from the drawing for sake of clarity in exposition). As transparency and ownership are fundamental to the persona paradigm, as discussed above, the personalization service may be configured to provide notifications 1215 to a user via the personalization system 1005 that locally executes on a computing device 110. Notifications may be triggered, for example, when an application accesses an abstract 1020, as respectively indicated by reference numerals 1220 and 1225. Such abstract access may be attendant to the user trying out a new application, for example, or may occur when an existing service/application seeks to access an updated persona.

Notifications 1215 may also be triggered responsively to the online application 1205 and/or online application 1210 providing respective persona usage signals 1230 and 1235 to inform a persona 405 to implement learning. The personalization service 135 can evolve the persona based on the usage signals, as indicated by reference numeral 1240. Generally, the workflows associated with persona access and learning are paused once the notifications are transmitted to the user. The workflows can resume upon receipt of suitable user consents 1245 at the personalization service. If the user withholds consent, then access to abstracts is prohibited and utilization of usage signals is restricted. This has the effect of placing the user's persona in a vault (i.e., a protected space) that is controlled exclusively by the user and is thus consistent with the fundamental principle of ownership.

Figure 13:
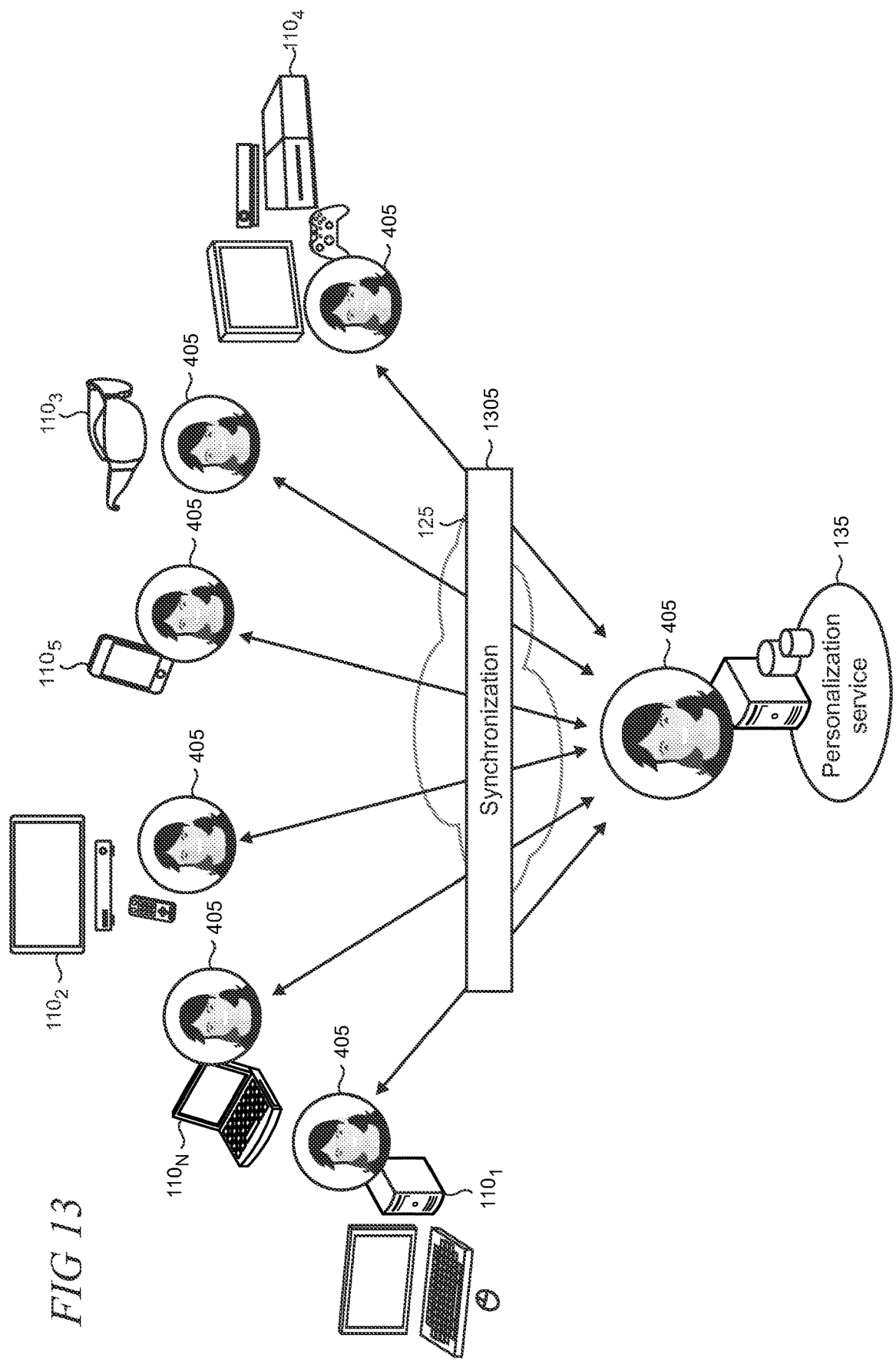
FIG. 13 shows illustrative synchronization of a persona between an illustrative personalization service and various computing devices.

As shown in FIG. 13, in some implementations of the present principles, changes to personas that may occur, for example from learning and evolution as discussed above, are propagated to all the computing devices 110 that may be associated with a single user. A synchronization function 1305 may be implemented between the personalization service 135 and the instances of the personalization system (not shown) that execute on the computing devices. The synchronization ensures that a currently updated instance of the persona 405 is available on each of the user's computing devices. User experiences may thus be consistently rendered based on the persona in a platform-independent manner.

Figure 14:
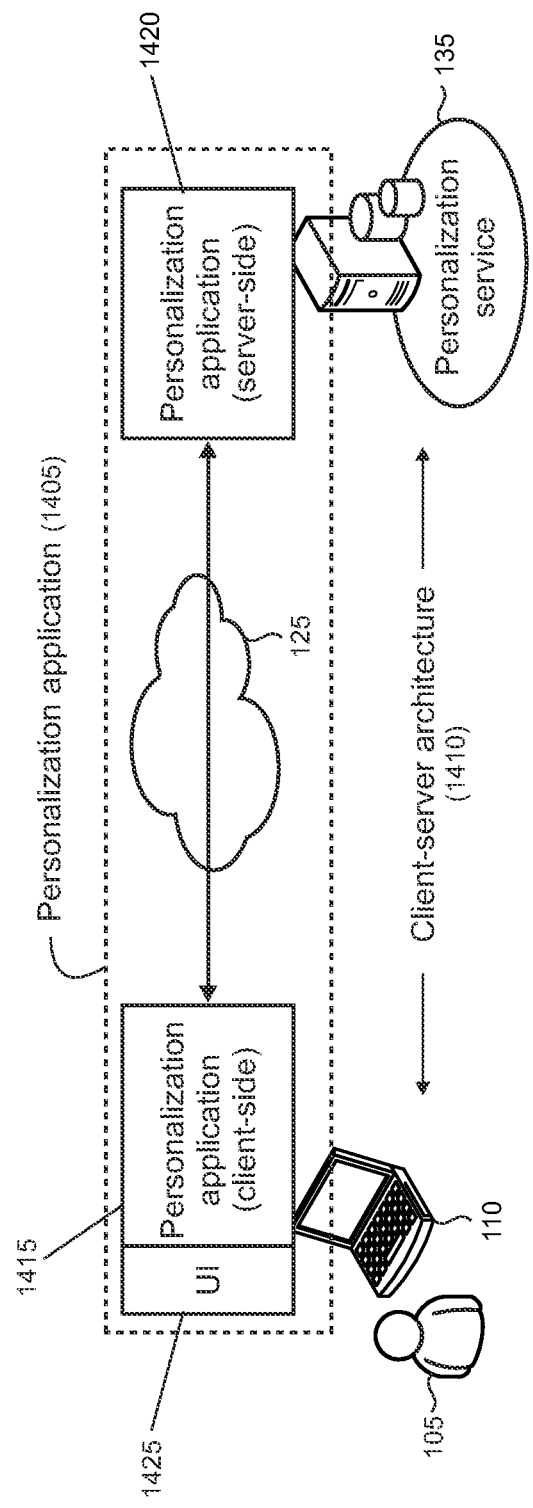
FIG. 14 shows an illustrative personalization application that is implemented using a client-server architecture.

FIG. 14 shows an illustrative personalization application 1405 that is implemented using a client-server architecture 1410 operable over the network 125. The personalization application provides tools for users to personalize and manage their personas. The architecture includes a client-side component 1415 that is locally executable on the computing device 110 and a server-side component 1420 that is remotely executable on one or more servers of the personalization service 135. The client-side component of the personalization application exposes a user interface (UI) 1425 to the user 105. The particular split of computing functions that are implemented between the client-side and service-side components of the personalization application can vary as needed to meet particular requirements.

Figure 15:
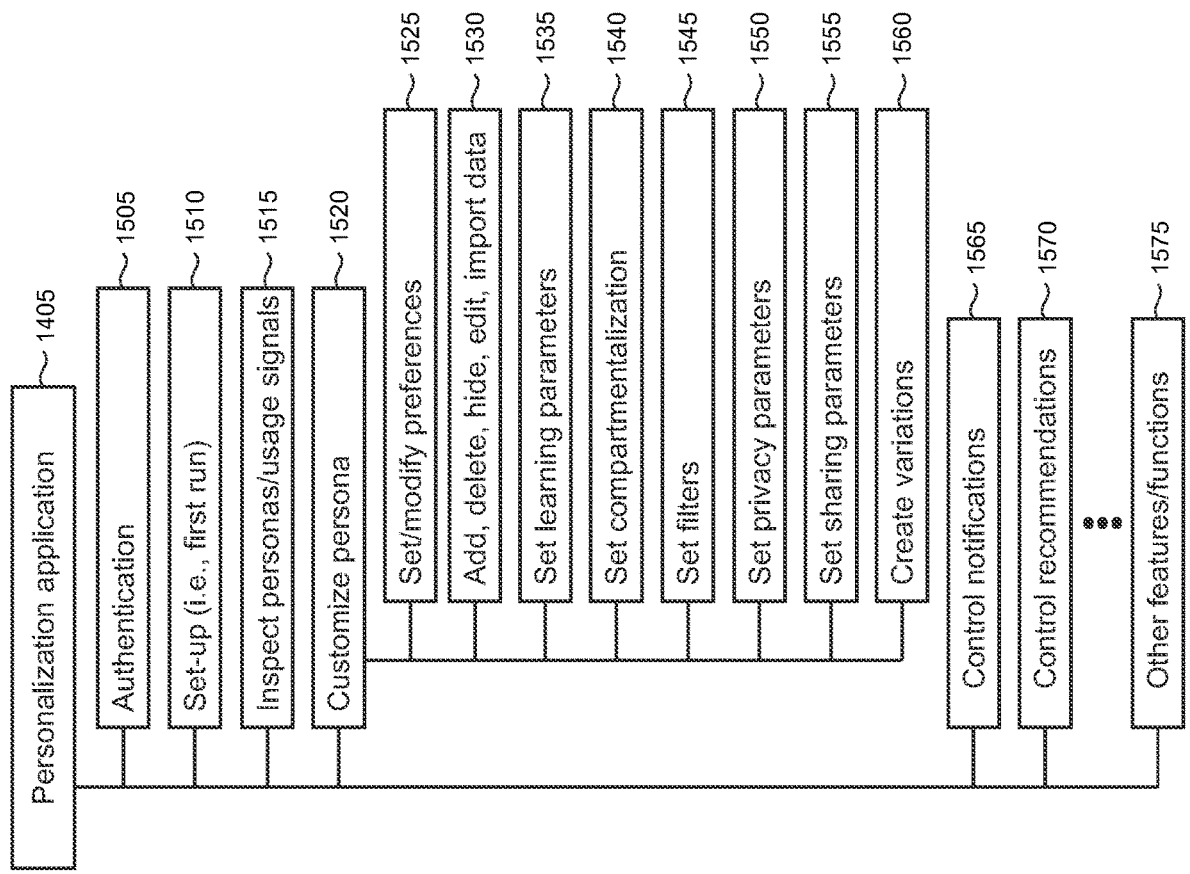
FIG. 15 shows illustrative features and functions supported by a personalization application.

FIG. 15 shows illustrative features and functions supported by the personalization application 1405. The features and functions supported by the personalization application shown are illustrative, may overlap, and do not comprise an exhaustive listing. Not all of the features and functions need to be utilized in every implementation of the personalization application. The depiction of the features and functions in the drawings does not provide or imply any workflow order.

The personalization application 1405 may support an authentication feature 1505 configured to confirm an identity of the user and authorize the user to utilize the application.

An application set-up feature 1510 is provided to enable the user to create a persona. Typically, a create function is launched by default as part of the set-up when the application runs for the first time, however, users can create new personas at any time during subsequent application uses.

Figure 16:
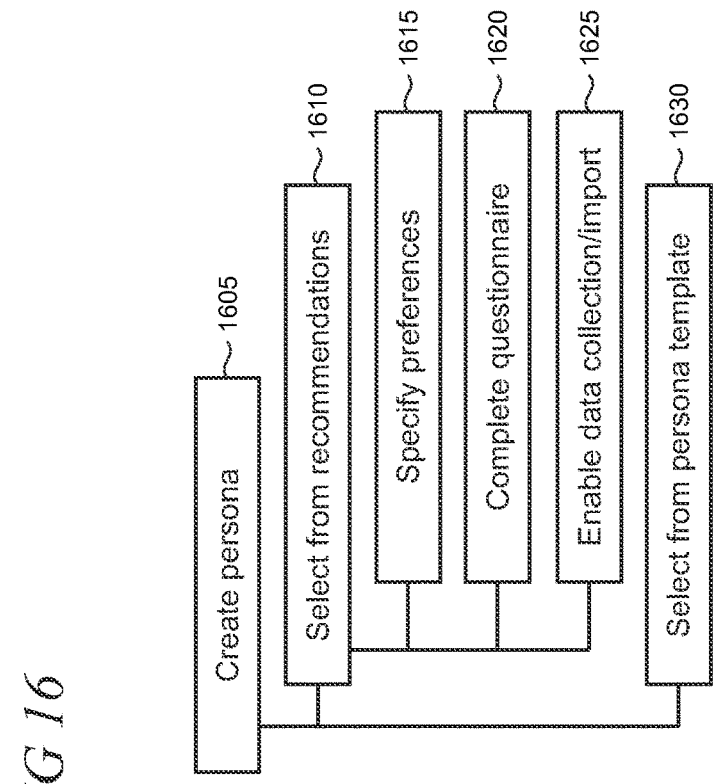
FIG. 16 shows an illustrative persona creation function of a personalization application.

An illustrative persona creation function 1605 of the personalization application 1405 (FIG. 14) is shown in FIG. 16. The persona creation function may provide different options including selecting from among persona recommendations 1610. For initial persona creation, the user may specify preferences 1615 using suitable UI elements and controls such as menu systems and forms. The personalization application can also be configured to offer a questionnaire 1620 to the user, such as a quiz or survey, to help identify appropriate personalization parameters. The scope of the questionnaire can vary by implementation, for example, from a simple quiz to a more in-depth personality test. The personalization application can develop recommendations for personas surfaced to users by enabling data collection and/or importation 1625 from external sources or from other applications exposed to the user on a computing device.

Personas may also be created using the personalization application using selections from a persona template 1630 to assemble a suitable persona. The templates can provide, for example, a variety of preset persona types and characteristics that may be used singly or in combination to create a persona. Persona types in the template can be labelled to facilitate user navigation in the application such as "trend setter," "social butterfly," "sports-addict," etc.

Returning to FIG. 15, the personalization application 1405 provides an inspection function 1515 to facilitate transparency of deployed personas and usage signals provided by applications that inform persona evolution during learning and abstract access. The inspection function may include notice and consent mechanisms, as discussed above, in accordance with the ownership principles of the present personalization model.

The personalization application 1405 provides a persona customization function 1520 to enable users to customize persona data that is exposed to applications in abstracts. The customization function includes controls for setting and modifying user preferences 1525, adding, deleting, hiding, editing, importing data 1530, setting learning parameters 1535 (e.g., enabling/disabling learning using data from particular applications), setting compartmentalization 1540, setting filters 1545, setting privacy parameters 1550 (e.g., data inclusion/exclusion rules), and setting sharing parameters 1555 (e.g., whitelists/blocklists).

Persona variations can be created 1560 with the personalization application 1405 using techniques such as morphing and/or blending. For example, suitable controls can be exposed by the application to allow the user to impose variations on an existing persona or preset persona template and/or combine personas. The personalization model can further be configured to track persona creation and variation activities to enable users to revert back to previously utilized personas, toggle between personas, and view persona usage histories among different ecosystems.

The personalization application 1405 may further be configured to enable the user to control how notifications 1565 are surfaced. The application may provide different user-selectable ways to access, receive, and manage notifications including how, when, and where notifications appear. The application may further enable the user to customize settings for particular applications, such as appearance and sounds, turning off specific notifications, and so on. For example, the user may choose to have notifications be distributed across the user's computing devices 110 (FIG. 1) or be limited to particular devices.

In some implementations of the present personalization model, a recommendation system may be utilized to provide a centralized source of recommendations that span ecosystems. The recommendation system is discussed further in the description that accompanies FIG. 17 below. In such implementations, the personalization application 1405 can surface controls 1570 to control operations of the recommendation system. Various other features and functions 1575 can be incorporated into the personalization application to meet the needs of a particular implementation of the present principles.

Figure 17:
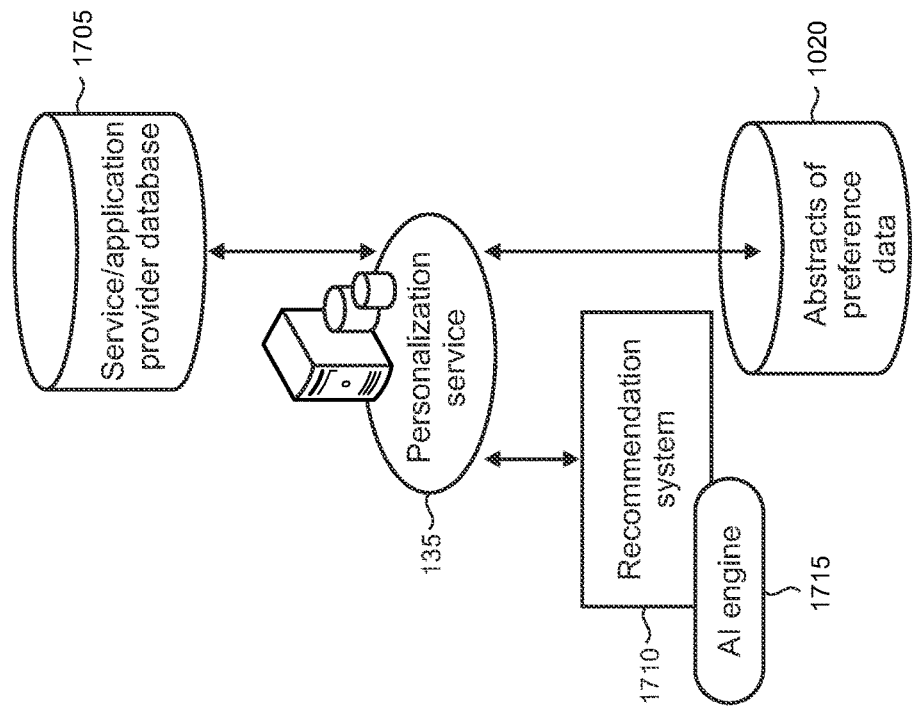
FIG. 17 shows components of an illustrative personalization service.

FIG. 17 shows components of an illustrative personalization service 135 that may be utilized in some implementations of the present sharable privacy-oriented personalization model. In addition to interacting with a database of abstracts 1020 as described above, the personalization service may access a database 1705 that includes information about various applications and ecosystems with which a user's persona may interact. For example, the database may assist in implementing context awareness, function as a source for data importation to inform persona creation and/or modification, and the like.

The personalization service 135 may further interact with a recommendation system 1710 that may provide collaborative filtering or content filtering functionalities. In some cases, the recommendation system may utilize an artificial intelligence (AI) engine 1715 to assist in identifying relationships among data used in the personalization model.

FIG. 18 is a flowchart of an illustrative method 1800 for providing persona-based personalization for a plurality of online applications providing user experiences rendered on a computing device to a user. The method may be implemented, for example, on a computing device, such as a server, utilized in the personalization service 135 (FIG. 1). Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 1805 comprises receiving a user selection of a persona, in which the persona provides an abstracted representation of the user to the plurality of online applications and to which the user experiences are responsively delivered for rendering on the computing device. Block 1810 comprises storing data associated with the persona in a datastore. Block 1815 comprises determining a context pertaining to the delivery of user experiences by the online applications to the computing device responsively to the persona.

Block 1820 comprises revising the persona data in the datastore based on the context determination to update the persona. Block 1825 comprises sending the revised persona data for the updated persona to the plurality of online services for delivery of user experiences responsively to the updated persona.

Figure 19:
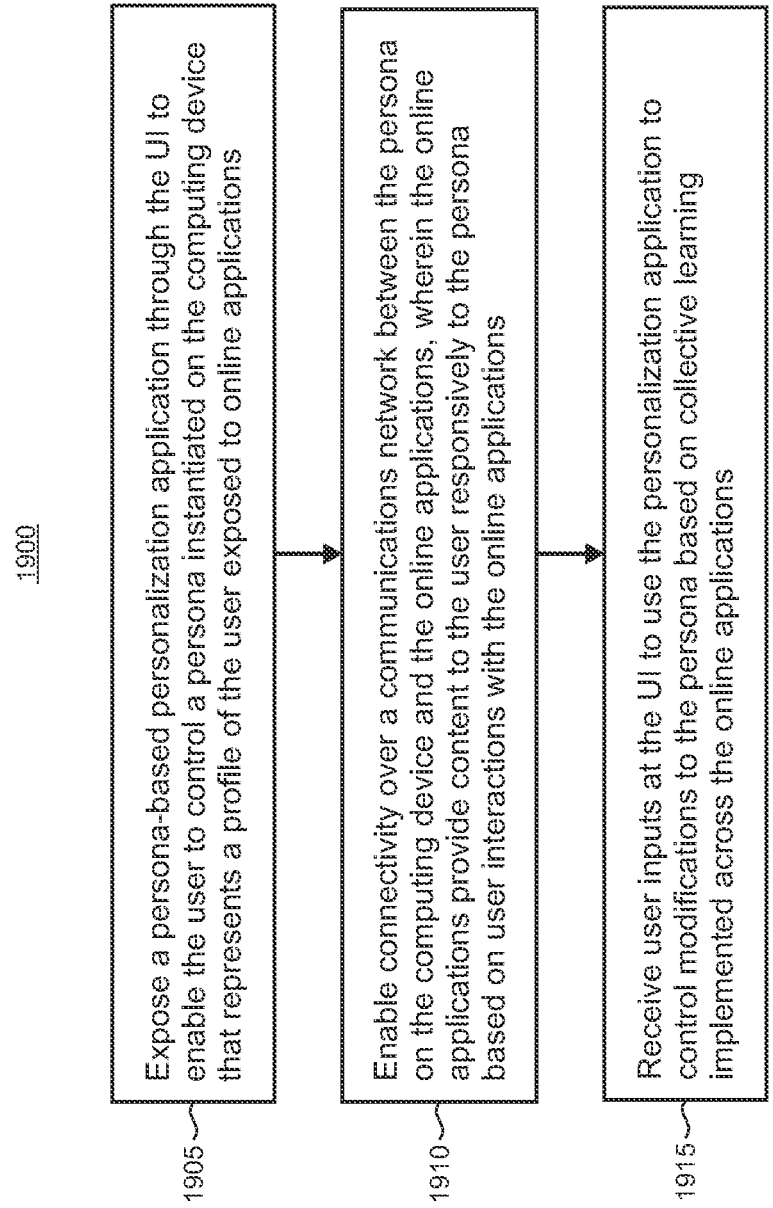

FIG. 19 is a flowchart of an illustrative method 1900 that may be implemented on a computing device 110 (FIG. 1) such as a PC or smartphone that includes a UI. At block 1905, a persona-based personalization application is exposed through the UI to enable the user to control a persona instantiated on the computing device that represents a profile of the user exposed to online applications. At block 1910, connectivity is enabled over a communications network between the persona on the computing device and the online applications, wherein the online applications provide content to the user responsively to the persona based on user interactions with the online applications. At block 1915, user inputs are received at the UI to use the personalization application to control modifications to the persona based on collective learning implemented across the online applications.

Figure 20:
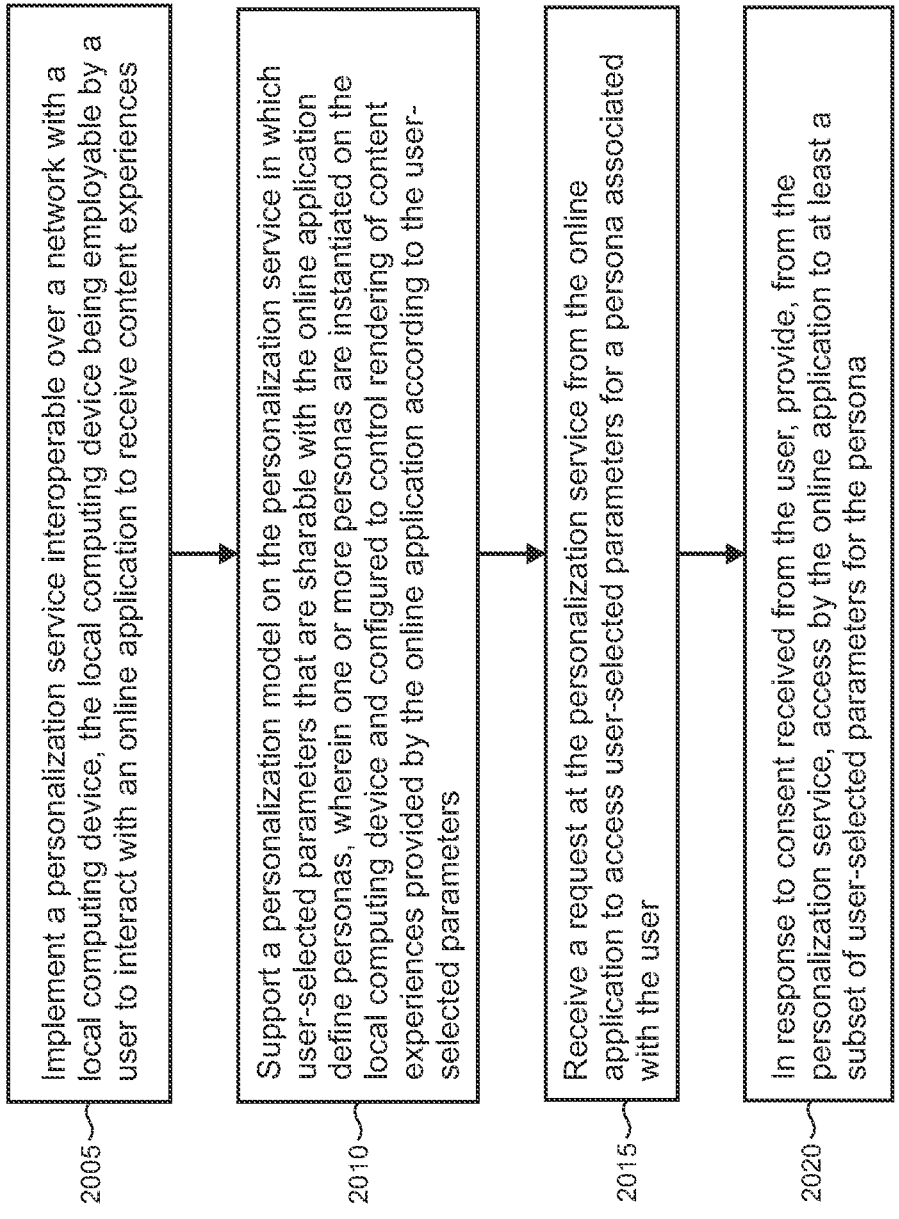

FIG. 20 is a flowchart of an illustrative method 2000 that may be implemented on a computing device, such as a server, utilized in the personalization service 135 (FIG. 1). At block 2005, a personalization service is implemented that is interoperable over a network with a local computing device, in which the local computing device is employable by a user to interact with an online application to receive content experiences. At block 2010, a personalization model is supported on the personalization service in which user-selected parameters that are sharable with the online application define personas, wherein one or more personas are instantiated on the local computing device and configured to control rendering of content experiences provided by the online application according to the user-selected parameters.

At block 2015, a request is received at the personalization service from the online application to access user-selected parameters for a persona associated with the user. At block 2020, in response to consent received from the user, access by the online application to at least a subset of user-selected parameters for the persona is provided from the personalization service.

Figure 21:
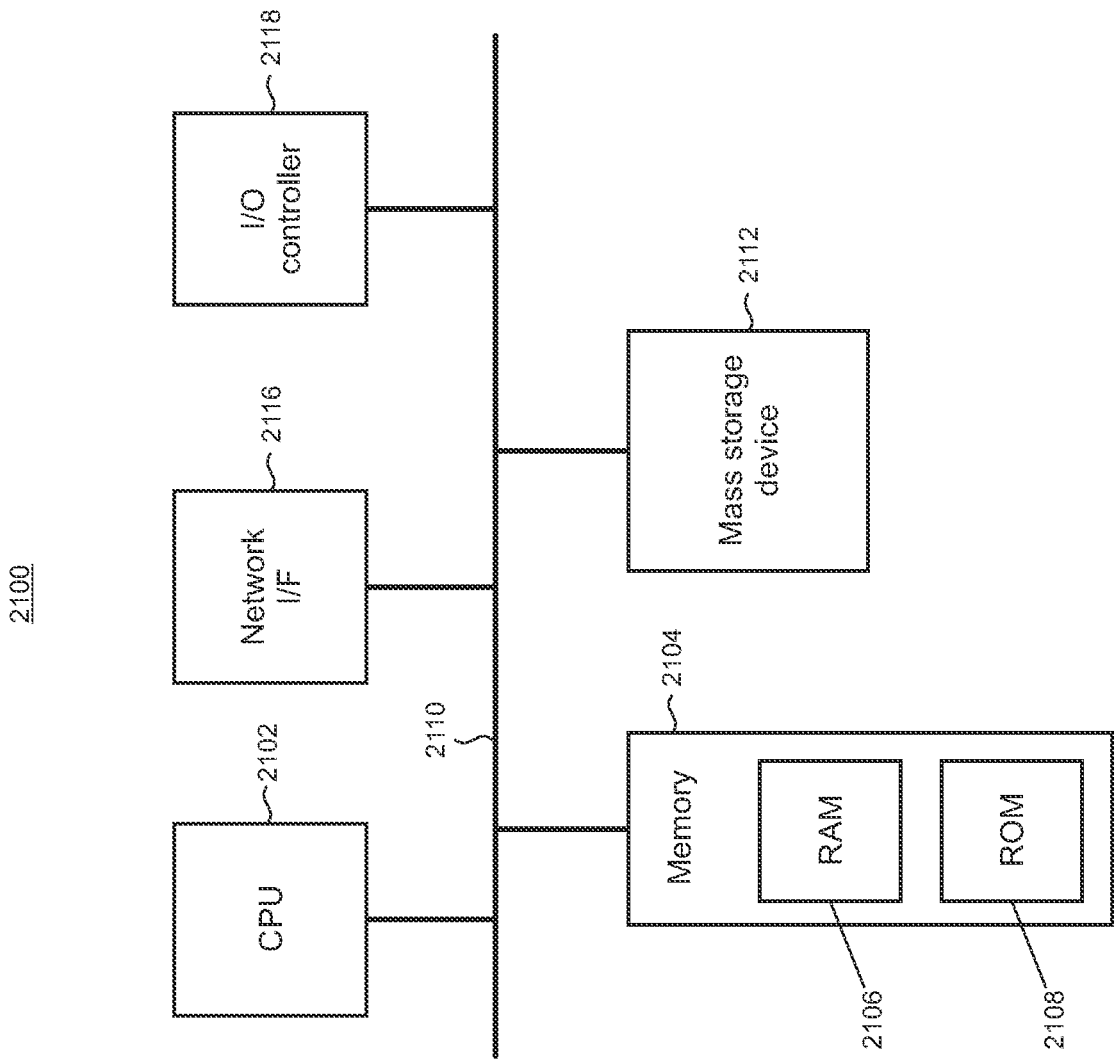
FIG. 21 is a block diagram of an illustrative computing device that may be used, at least in part, to implement the present sharable privacy-oriented personalization model.

FIG. 21 shows an illustrative architecture 2100 for a device capable of executing the various components described herein for providing the present sharable privacy-oriented personalization model. Thus, the architecture 2100 illustrated in FIG. 21 shows an architecture that may be adapted for the computing device 110 shown in FIG. 1 and described in the accompanying text.

The architecture 2100 illustrated in FIG. 21 includes a CPU (Central Processing Unit) 2102, a system memory 2104, including a RAM 2106 and a ROM 2108, and a system bus 2110 that couples the memory 2104 to the CPU 2102. A basic input/output system containing the basic routines that help to transfer information between elements within the architecture 2100, such as during startup, is stored in the ROM 2108. The architecture 2100 further includes a mass storage device 2112 for storing software code or other computer-executed code that is utilized to implement applications, the file system, and the operating system.

The mass storage device 2112 is connected to the CPU 2102 through a mass storage controller (not shown) connected to the bus 2110. The mass storage device 2112 and its associated computer-readable storage media provide non-volatile storage for the architecture 2100.

Although the description of computer-readable storage media contained herein refers to a mass storage device, such as a hard disk or CD-ROM drive, it may be appreciated by those skilled in the art that computer-readable storage media can be any available storage media that can be accessed by the architecture 2100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2100.

According to various embodiments, the architecture 2100 may operate in a networked environment using logical connections to remote computers through a network. The architecture 2100 may connect to the network through a network interface unit 2116 connected to the bus 2110. It may be appreciated that the network interface unit 2116 also may be utilized to connect to other types of networks and remote computer systems. The architecture 2100 also may include an input/output controller 2118 for receiving and processing input from a number of other devices, including a keyboard, mouse, or electronic stylus (not shown in FIG. 21). Similarly, the input/output controller 2118 may provide output to a display screen, a printer, or other type of output device (also not shown in FIG. 21).

It may be appreciated that the software components described herein may, when loaded into the CPU 2102 and executed, transform the CPU 2102 and the overall architecture 2100 from a general-purpose computing system into a special-purpose computing system customized to facilitate the functionality presented herein. The CPU 2102 may be constructed from any number of transistors or other discrete circuit elements, which may individually or collectively assume any number of states. More specifically, the CPU 2102 may operate as a finite-state machine, in response to executable instructions contained within the software modules disclosed herein. These computer-executable instructions may transform the CPU 2102 by specifying how the CPU 2102 transitions between states, thereby transforming the transistors or other discrete hardware elements constituting the CPU 2102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2100 in order to store and execute the software components presented herein. It also may be appreciated that the architecture 2100 may include other types of computing devices, including handheld computers, embedded computer systems, smartphones, PDAs, and other types of computing devices known to those skilled in the art. It is also contemplated that the architecture 2100 may not include all of the components shown in FIG. 21, may include other components that are not explicitly shown in FIG. 21, or may utilize an architecture completely different from that shown in FIG. 21.

Figure 22:
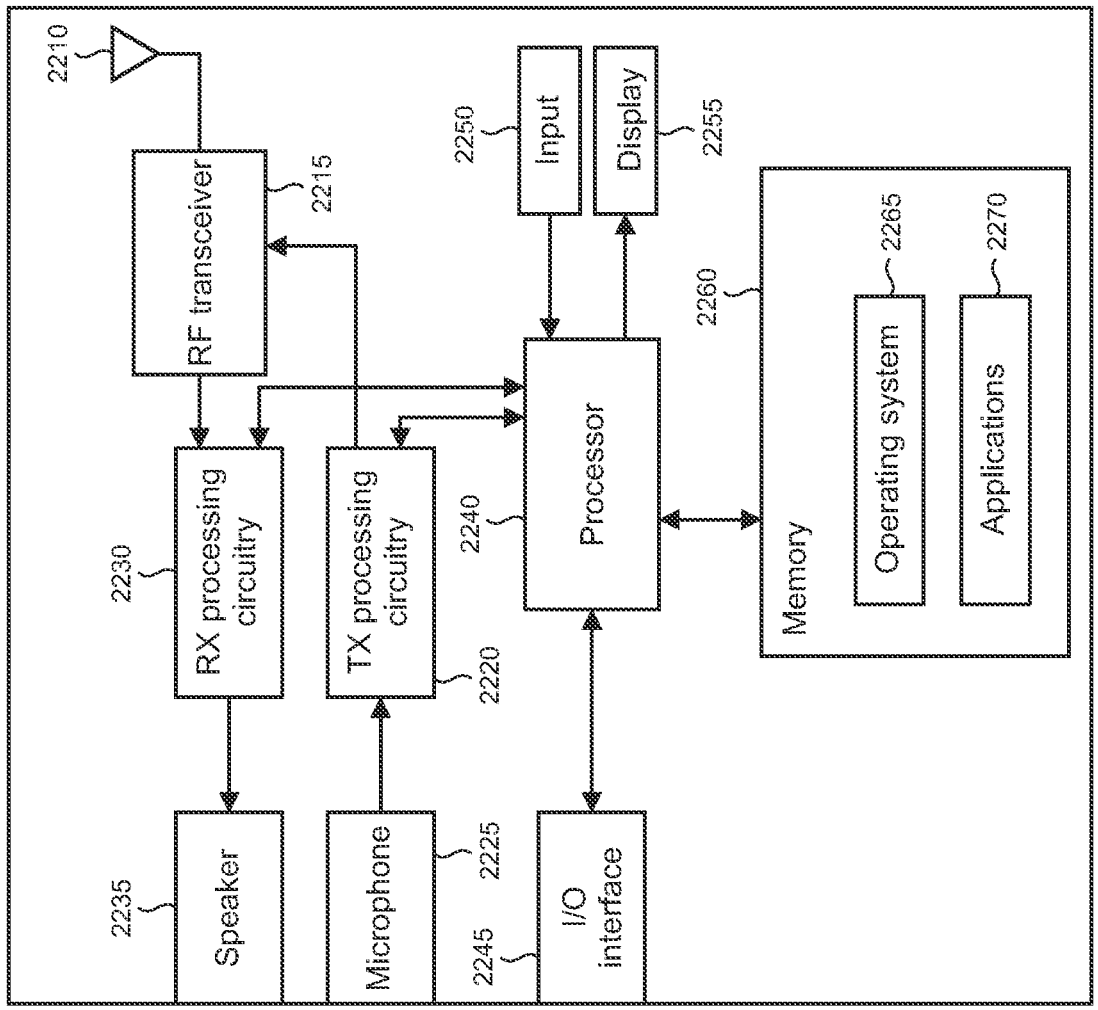
FIG. 22 is a block diagram of an illustrative mobile computing device that may be used, at least in part, to implement the present sharable privacy-oriented personalization model.

FIG. 22 is a block diagram of an illustrative mobile computing device, such as a smartphone 2200, that may be used to implement the present sharable privacy-oriented personalization model. The smartphone 2200 includes an antenna 2210, a radio frequency (RF) transceiver 2215, transmit (TX) processing circuitry 2220, a microphone 2225, and receive (RX) processing circuitry 2230. The smartphone also includes a speaker 2235, a processor 2240, an input/output (I/O) interface 2245, an input device 2250, a display 2255, and a memory 2260. The memory includes an operating system (OS) program 2265 and one or more applications 2270.

The RF transceiver 2215 receives from the antenna 2210, an incoming RF signal transmitted by a gNodeB of a 5G network. The RF transceiver down-converts the incoming RF signal to generate an intermediate frequency (IF) or baseband signal. The IF or baseband signal is sent to the RX processing circuitry 2230, which generates a processed baseband signal by filtering, decoding, and/or digitizing the baseband or IF signal. The RX processing circuitry transmits the processed baseband signal to the speaker 2235 (such as for voice data) or to the processor 2240 for further processing (such as for web browsing data).

The TX processing circuitry 2220 receives analog or digital voice data from the microphone 2225 or other outgoing baseband data (such as web data, e-mail, or interactive video game data) from the processor 2240. The TX processing circuitry 2220 encodes, multiplexes, and/or digitizes the outgoing baseband data to generate a processed baseband or IF signal. The RF transceiver 2215 receives the outgoing processed baseband or IF signal from the TX processing circuitry and up-converts the baseband or IF signal to an RF signal that is transmitted via the antenna.

The processor 2240 can include one or more processors or other processing devices and execute the OS program 2265 stored in the memory 2260 to control the overall operation of the smartphone 2200. For example, the processor may control the reception of forward channel signals and the transmission of reverse channel signals by the RF transceiver 2215, the RX processing circuitry 2230, and the TX processing circuitry 2220 in accordance with well-known principles. In some embodiments, the processor 2240 includes at least one microprocessor or microcontroller.

The processor 2240 may be configured for executing other processes and programs resident in the memory 2260, such as operations for CSI measurement and reporting for systems described in embodiments of the present disclosure. The processor can move data into or out of the memory as required by an executing process. In some embodiments, the processor may be configured to execute the applications 2270 based on the OS program 2265 or in response to signals received from gNodeBs or an operator. The processor is also coupled to the I/O interface 2245, which provides the smartphone 2200 with the ability to connect to other computing devices such as laptop computers and handheld computers. The I/O interface may thus function as a communication path between such accessories and the processor.

The processor 2240 is also coupled to the input device 2250 (e.g., keypad, touchscreen, buttons etc.) and the display 2255. A user of the smartphone 2200 can typically employ the input device to enter data into the smartphone. For example, the display can be a liquid crystal display or other display capable of rendering text and/or graphics, video, etc., from web sites, applications and/or service providers. The memory 2260 is coupled to the processor 2240. Part of the memory may include a random access memory (RAM), and another part of the memory may include a Flash memory or other read-only memory (ROM).

Although FIG. 22 shows one illustrative example of smartphone 2200, it may be appreciated that various changes may be made to the drawing. For example, various components may be combined, further subdivided, or omitted and additional components may be added according to particular needs. As a particular example, the processor 2240 may be divided into multiple processors, such as one or more central processing units (CPUs) and one or more graphics processing units (GPUs).

Figure 23:
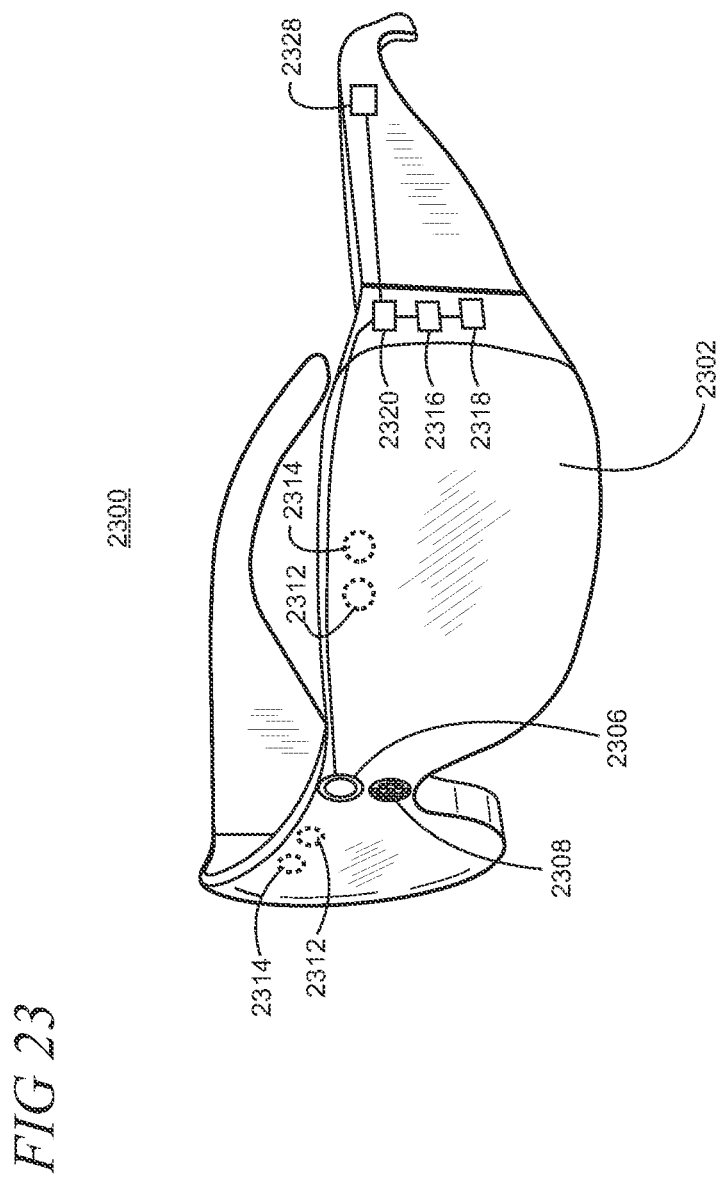
FIG. 23 is a pictorial view of an illustrative example of a virtual-reality or mixed-reality head-mounted display (HMD) device that may be used, at least in part, to implement the present sharable privacy-oriented personalization model.
Figure 24:
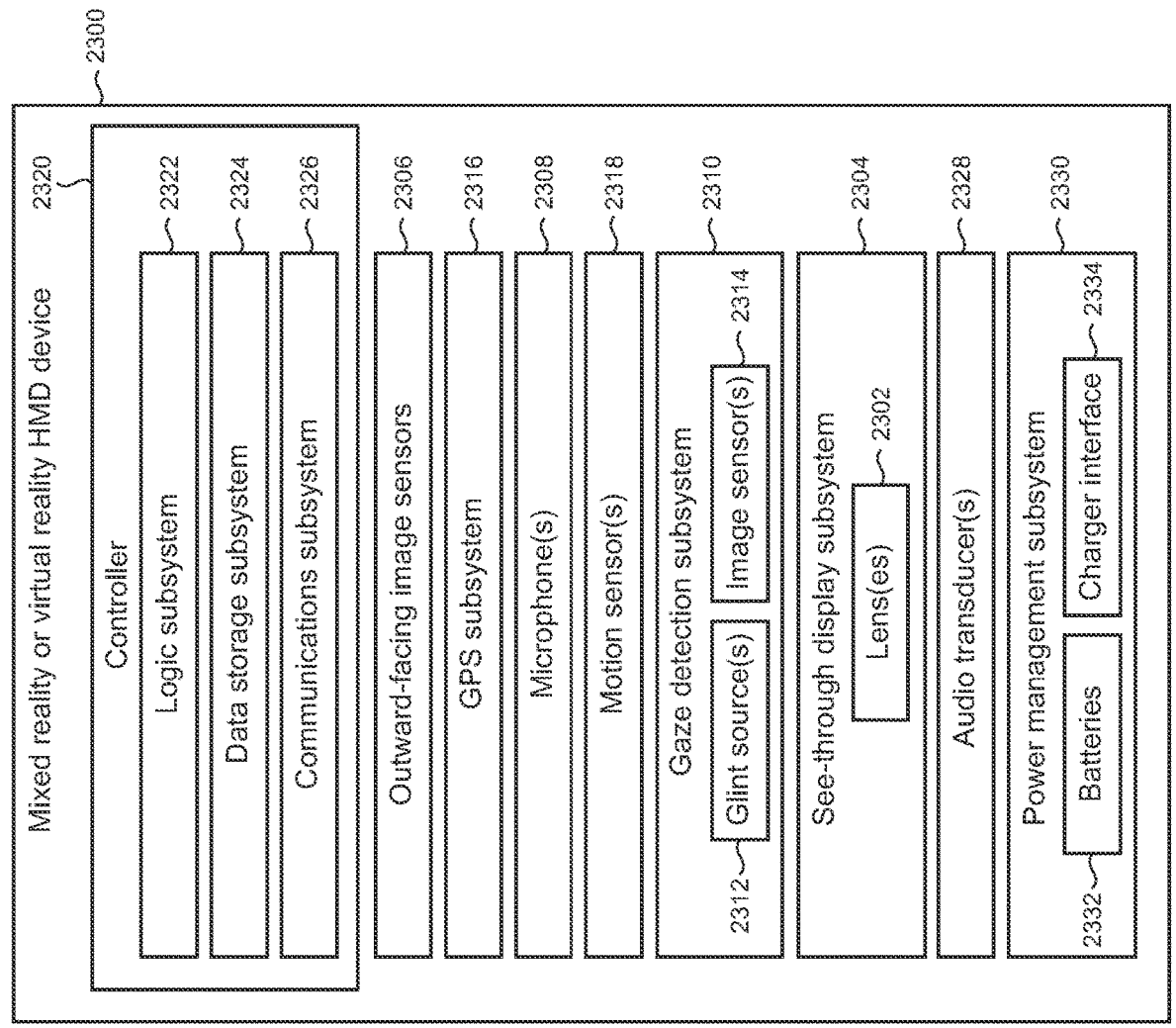
FIG. 24 shows a block diagram of an illustrative example of a virtual-reality or mixed-reality HMD device that may be used, at least in part, to implement the present sharable privacy-oriented personalization model.

FIG. 23 shows one particular illustrative example of an HMD device 2300 that may be adapted for use with mixed-reality and/or virtual reality environments, and FIG. 24 shows a functional block diagram of the device 2300. HMD device 2300 comprises one or more lenses 2302 that form a part of a see-through display subsystem 2304, so that images may be displayed using lenses 2302 (e.g., using projection onto lenses 2302, one or more waveguide systems, such as a near-eye display system, incorporated into the lenses 2302, and/or in any other suitable manner).

HMD device 2300 further comprises one or more outward-facing image sensors 2306 configured to acquire images of a background scene and/or physical environment being viewed by a user and may include one or more microphones 2308 configured to detect sounds, such as voice commands from a user. Outward-facing image sensors 2306 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 2300 may further include a gaze detection subsystem 2310 configured for detecting a direction of gaze of each eye of a user or a direction or location of focus, as described above. Gaze detection subsystem 2310 may be configured to determine gaze directions of each of a user's eyes in any suitable manner. For example, in the illustrative example shown, a gaze detection subsystem 2310 includes one or more glint sources 2312, such as virtual IR light or visible sources as described above, that are configured to cause a glint of light to reflect from each eyeball of a user, and one or more image sensors 2314, such as inward-facing sensors, that are configured to capture an image of each eyeball of the user. Changes in the glints from the user's eyeballs and/or a location of a user's pupil, as determined from image data gathered using the image sensor(s) 2314, may be used to determine a direction of gaze.

In addition, a location at which gaze lines projected from the user's eyes intersect the external display may be used to determine an object at which the user is gazing (e.g., a displayed virtual object and/or real background object). Gaze detection subsystem 2310 may have any suitable number and arrangement of light sources and image sensors. In some implementations, the gaze detection subsystem 2310 may be omitted.

The HMD device 2300 may also include additional sensors. For example, HMD device 2300 may comprise a global positioning system (GPS) subsystem 2316 to allow a location of the HMD device 2300 to be determined. This may help to identify real-world objects, such as buildings, etc., that may be located in the user's adjoining physical environment.

The HMD device 2300 may further include one or more motion sensors 2318 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 2306. The use of motion data may allow changes in gaze direction to be tracked even if image data from outward-facing image sensor(s) 2306 cannot be resolved.

In addition, motion sensors 2318, as well as microphone(s) 2308 and gaze detection subsystem 2310, also may be employed as user input devices, such that a user may interact with the HMD device 2300 via gestures of the eye, neck and/or head, as well as via verbal commands in some cases. It may be understood that sensors illustrated in FIGS. 23 and 24 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2300 can further include a controller 2320 such as one or more processors having a logic subsystem 2322 and a data storage subsystem 2324 in communication with the sensors, gaze detection subsystem 2310, display subsystem 2304, and/or other components through a communications subsystem 2326. The communications subsystem 2326 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2324 may include instructions stored thereon that are executable by logic subsystem 2322, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2300 is configured with one or more audio transducers 2328 (e.g., speakers, earphones, etc.) so that audio can be utilized as part of a mixed-reality or virtual-reality experience. A power management subsystem 2330 may include one or more batteries 2332 and/or protection circuit modules (PCMs) and an associated charger interface 2334 and/or remote power interface for supplying power to components in the HMD device 2300.

It may be appreciated that the HMD device 2300 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Various exemplary embodiments of the present sharable privacy-oriented personalization model are now presented by way of illustration and not as an exhaustive list of all embodiments. An example includes a method for providing persona-based personalization for a plurality of online applications providing user experiences rendered on a computing device to a user of the online applications, comprising: receiving a user selection of a persona, the persona providing an abstracted representation of the user to the plurality of online applications and to which the user experiences are responsively delivered for rendering on the computing device; storing data associated with the persona in a datastore; determining a context pertaining to the delivery of user experiences by the online applications to the computing device responsively to the persona; revising the persona data in the datastore based on the context determination to update the persona; and sending the revised persona data for the updated persona to the plurality of online applications for delivery of user experiences responsively to the updated persona.

In another example, the context determination comprises one of receiving signals from an online application describing one of user environment, computing environment, or physical environment, or receiving signals from the computing device describing one of user environment, computing environment, or physical environment. In another example, the context determination is individualized to each of the online applications among the plurality. In another example, the method further comprises synchronizing the updated persona to each of a plurality of different computing devices associated with the user. In another example, the user experiences are associated with one or more of social networking, content experiences, mapping, news and information, entertainment, travel, productivity, or finance applications.

A further example includes a computing device employable by a user, comprising: one or more processors; a user interface (UI) operatively coupled to the one or more processors; and one or more non-transitory computer-readable memory devices storing instructions which, when executed by the one or more processors, cause the computing device to expose a persona-based personalization application through the UI to enable the user to control a persona instantiated on the computing device that represents a profile of the user exposed to online applications; enable connectivity over a communications network between the persona on the computing device and the online applications, wherein the online applications provide content to the user responsively to the persona based on user interactions with the online applications; and receive user inputs at the UI to use the personalization application to control modifications to the persona based on collective learning implemented across the online applications.

In another example, the collective learning is implemented using persona usage signals from one or more reporting online applications, the persona usage signals describing user preferences that are learned from user behaviors with the reporting online applications. In another example, the control of the persona comprises enabling the user, through the personalization application, to select a scope of profile data that is exposed by the persona to the online applications. In another example, the control of the modifications comprises enabling the user, through the personalization application, to select which online applications contribute to the collective learning. In another example, the personalization application is configured to enable the user to modify a persona by combining different existing personas. In another example, the personalization application is configured to enable the user to implement one of content filtering in a persona, compartmentalization of a persona, or instantiation of multiple different personas on the computing device. In another example, the personalization application is configured to enable the user to inspect data associated with the persona and inspect signals from the online applications associated with the collective learning. In another example, the UI is supported on a browser and the user interacts with the online applications using the browser. In another example, the computing device further comprises one or more sensors for monitoring an environment in which the computing device operates to develop context, wherein the context is used to control the modifications to the persona.

A further example includes one or more non-transitory computer-readable memory devices storing instructions which, when executed by one or more processors disposed in a cloud-based computing device, cause the computing device to: implement a personalization service interoperable over a network with a local computing device, the local computing device being employable by a user to interact with an online application to receive content experiences; support a personalization model on the personalization service in which user-selected parameters that are sharable with the online application define personas, wherein one or more personas are instantiated on the local computing device and configured to control rendering of content experiences provided by the online application according to the user-selected parameters; receive a request at the personalization service from the online application to access user-selected parameters for a persona associated with the user; in response to consent received from the user, provide, from the personalization service, access by the online application to at least a subset of user-selected parameters for the persona.

In another example, the executed instructions further cause the computing device to notify the user of the access request from the online application. In another example, the local computing device supports a personalization system that interoperates with the personalization service in which the notification is surfaced on the personalization system. In another example, the executed instructions further cause the personalization service to monitor context associated with the interactions between the user and the online application and the personalization service controls the access based on the monitored context. In another example, the executed instructions further cause the personalization service to store user-selectable parameters in a datastore. In another example, the content experiences comprise one of streaming services, video sharing, on-demand music and video, online gaming, blogs, or feeds.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing persona-based personalization for a plurality of online applications providing user experiences rendered on a computing device to a user of the online applications, comprising:
    receiving a user selection of a persona that the user generates, modifies, and controls using a persona-based personalization application supported by a personalization model, the persona being an abstracted representation of the user providing a unique identity and user profile for each of the plurality of online applications and to which the user experiences are responsively delivered for rendering on the computing device;
    storing data associated with the persona in a datastore;
    determining a context pertaining to the delivery of user experiences by each of the online applications to the computing device responsively to the persona;
    collecting an individual set of persona usage signals from each online application to implement collective learning by the persona-based personalization application across the online applications, in which each individual set of persona usage signals represents the user's usage of a respective online application as a supplement to content and data supporting the user experiences delivered from each online application;
    revising the persona data in the datastore based on the context determination;
    configuring the persona-based personalization to modify the persona based on the revised persona data and the collected individual sets of persona usage signals to update the user profile for the user; and
    sending the modified persona to each of the plurality of online applications, wherein the online applications deliver user experiences responsively to the modified persona.

2. The method of claim 1 wherein the context determination comprises one of receiving signals from an online application describing one of user environment, computing environment, or physical environment, or receiving signals from the computing device describing one of user environment, computing environment, or physical environment.

3. The method of claim 1 wherein the context determination is individualized to each of the online applications among the plurality.

4. The method of claim 1 further comprising synchronizing the modified persona to each of a plurality of different computing devices associated with the user.

5. The method of claim 1 wherein the user experiences are associated with one or more of social networking, content experiences, mapping, news and information, entertainment, travel, productivity, or finance applications.

6. A computing device employable by a user, comprising:
    one or more processors;
    a user interface (UI) operatively coupled to the one or more processors; and
    one or more non-transitory computer-readable memory devices storing instructions which, when executed by the one or more processors, cause the computing device to
    expose a persona-based personalization application supported by a personalization model through the UI to enable the user to generate, modify, and control a persona instantiated on the computing device that represents a unique identity and user profile for the user that is exposed to each of a plurality of online applications;

enable connectivity over a communications network between the persona on the computing device and the online applications, wherein the online applications provide content to the user responsively to the persona based on user interactions with the online applications;

collect an individual set of persona usage signals from each online application to implement collective learning by the persona-based personalization application across the online applications, in which each individual set of persona usage signals represents the user's usage of a respective online application as a supplement to the content from each online application;

configure the persona-based personalization application to modify the persona based on the collected individual sets of persona usage signals to update the user profile for the user;

receive user inputs at the UI to use the personalization application to control modifications to the persona based on collective learning implemented across the online applications; and expose the modified persona to each of the online applications responsively to the user inputs for controlling modifications to the persona, wherein the online applications provide content responsively to the modified persona.

7. The computing device of claim 6 wherein the collective learning is implemented using persona usage signals from one or more reporting online applications, the persona usage signals describing user preferences that are learned from user behaviors with the reporting online applications.

8. The computing device of claim 6 wherein the control of the persona comprises enabling the user, through the personalization application, to select a scope of user profile data that is exposed by the persona to the online applications.

9. The computing device of claim 6 wherein the control of the modifications comprises enabling the user, through the personalization application, to select which online applications contribute to the collective learning.

10. The computing device of claim 6 wherein the personalization application is configured to enable the user to modify a persona by combining different existing personas.

11. The computing device of claim 6 wherein the personalization application is configured to enable the user to implement one of content filtering in a persona, compartmentalization of a persona, or instantiation of multiple different personas on the computing device.

12. The computing device of claim 6 wherein the personalization application is configured to enable the user to inspect data associated with the persona and inspect signals from the online applications associated with the collective learning.

13. The computing device of claim 6 wherein the UI is supported on a browser and the user interacts with the online applications using the browser.

14. The computing device of claim 6 further comprising one or more sensors for monitoring an environment in which the computing device operates to develop context, wherein the context is used to control the modifications to the persona.

15. One or more non-transitory computer-readable memory devices storing instructions which, when executed by one or more processors disposed in a cloud-based computing device, cause the computing device to:

implement a personalization service interoperable over a network with a local computing device, the local computing device being employable by a user to interact with an online application to receive content experiences;

support a personalization model supporting the personalization service in which user-selected parameters for generating, modifying, and controlling a persona representing a unique identity and user profile for the user that is sharable with the online application, wherein one or more personas are instantiated on the local computing device and configured to control rendering of content experiences provided by the online application according to the user-selected parameters;

receive a request at the personalization service from the online application to access user-selected parameters for a persona associated with the user;

in response to consent received from the user, provide, from the personalization service, access by the online application to a subset of user-selected parameters for the persona;

collect a set of persona usage signals from the online application that represents the user's usage of the online application as a supplement to content and data supporting the content experiences rendered by the online application based on the access to the subset of user-selected parameters for the persona;

modify the persona by the persona-based personalization application based on the collected set of persona usage signals to update the user profile for the user; and trigger application of content filtering, by the persona-based personalization application, to user interactions with the online application in response to the modifying, wherein the content filtering is applied to block and identify content responsively to the updated user profile.

16. The one or more non-transitory computer-readable memory devices of claim 15 wherein the executed instructions further cause the computing device to notify the user of the access request from the online application.

17. The one or more non-transitory computer-readable memory devices of claim 16 wherein the local computing device supports a personalization system that interoperates with the personalization service in which the notification is surfaced on the personalization system.

18. The one or more non-transitory computer-readable memory devices of claim 15 wherein the executed instructions further cause the personalization service to monitor context associated with the interactions between the user and the online application and the personalization service controls the access based on the monitored context.

19. The one or more non-transitory computer-readable memory devices of claim 15 wherein the content experiences comprise one of streaming services, video sharing, on-demand music and video, online gaming, blogs, or feeds.

20. The one or more non-transitory computer-readable memory devices of claim 15 wherein the executed instructions further cause the personalization service to expose the modified persona to each of a plurality of online applications and wherein the online applications provide content responsively to the modified persona.

* * * * *